United States Patent
Michael et al.

(10) Patent No.: US 9,748,019 B2
(45) Date of Patent: Aug. 29, 2017

(54) SINGLE PHASE LEAD-FREE CUBIC PYROCHLORE BISMUTH ZINC NIOBATE-BASED DIELECTRIC MATERIALS AND PROCESSES FOR MANUFACTURE

(71) Applicant: The Penn State Research Foundation, University Park, PA (US)

(72) Inventors: Elizabeth K. Michael, State College, PA (US); Susan Trolier-McKinstry, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/207,653

(22) Filed: Jul. 12, 2016

(65) Prior Publication Data

US 2016/0318806 A1 Nov. 3, 2016

Related U.S. Application Data

(62) Division of application No. 14/708,392, filed on May 11, 2015, now Pat. No. 9,520,207.

(60) Provisional application No. 61/991,050, filed on May 9, 2014, provisional application No. 62/072,484, filed on Oct. 30, 2014.

(51) Int. Cl.
| | |
|---|---|
| *C04B 35/495* | (2006.01) |
| *H04B 3/12* | (2006.01) |
| *H01B 3/12* | (2006.01) |
| *C04B 35/632* | (2006.01) |
| *C04B 35/638* | (2006.01) |

(52) U.S. Cl.
CPC ............. *H01B 3/12* (2013.01); *C04B 35/495* (2013.01); *C04B 35/632* (2013.01); *C04B 35/638* (2013.01); *C04B 2235/3255* (2013.01); *C04B 2235/3284* (2013.01); *C04B 2235/3298* (2013.01); *C04B 2235/656* (2013.01)

(58) Field of Classification Search
CPC ...... C04B 35/495; C01G 33/06; C01B 13/185
See application file for complete search history.

(56) References Cited

U.S. PATENT DOCUMENTS

| | | | |
|---|---|---|---|
| 6,482,527 | B1 | 11/2002 | Shrout et al. |
| 7,408,187 | B2 | 8/2008 | Kim et al. |
| 7,541,626 | B2 | 6/2009 | Kim et al. |
| 8,558,324 | B2 | 10/2013 | Kim et al. |
| 2004/0063565 | A1 | 4/2004 | Dai |
| 2006/0108579 | A1 | 5/2006 | Kim et al. |
| 2006/0234852 | A1 | 10/2006 | Kim et al. |
| 2009/0278211 | A1 | 11/2009 | Kim et al. |

*Primary Examiner* — Karl Group
(74) *Attorney, Agent, or Firm* — Dinsmore & Shohl LLP

(57) ABSTRACT

Both single phase lead-free cubic pyrochlore bismuth zinc niobate (BZN)-based dielectric materials with a chemical composition of $Bi_{1.5}Zn_{(0.5+y)}Nb_{(1.5-x)}Ta_{(x)}O_{(6.5+y)}$, with $0 \leq x < 0.23$ and $0 \leq y < 0.9$ and films with these average compositions with $Bi_2O_3$ particles in an amorphous matrix and a process of manufacture thereof. The crystalline BZNT-based dielectric material has a relative permittivity of at least 120, a maximum applied electric field of at least 4.0 MV/cm at 10 kHz, a maximum energy storage at 25° C. and 10 kHz of at least 50 J/cm³ and a maximum energy storage at 200° C. and 10 kHz of at least 22 J/cm³. The process is a wet chemical process that produces thin films of $Bi_{1.5}Zn_{(0.5+y)}Nb_{(1.5-x)}Ta_{(x)}O_{(6.5+y)}$ without the use of 2-methoxyethanol and pyridine.

18 Claims, 13 Drawing Sheets
(1 of 13 Drawing Sheet(s) Filed in Color)

SINGLE PHASE LEAD-FREE CUBIC PYROCHLORE BISMUTH ZINC NIOBATE-BASED DIELECTRIC MATERIALS AND PROCESSES FOR MANUFACTURE

CROSS-REFERENCE TO RELATED APPLICATIONS

This application is a divisional application of U.S. patent application Ser. No. 14/708,392 filed May 11, 2015, now U.S. Pat. No. 9,520,207, which claims priority of U.S. Provisional Patent Application Ser. No. 61/991,050 filed May 9, 2014, and U.S. Provisional Patent Application Ser. No. 62/072,484 filed Oct. 30, 2014, all of which are incorporated in their entirety herein by reference.

GOVERNMENT SPONSORSHIP

This invention was made with Government support under Grant No. DGE1255832, awarded by the National Science Foundation. The Government has certain rights to the invention.

FIELD OF THE TECHNOLOGY

The present disclosure relates in general to a dielectric material, and in particular to either a single phase lead-free cubic pyrochlore bismuth zinc niobate-based dielectric material or a nanocomposite film based on similar compositions, for high-temperature dielectric energy storage.

BACKGROUND

High frequency capacitors are used in a variety of applications, ranging from industrial lasers to implantable medical devices, such as heart defibrillators. Implantable heart defibrillator pulse generators require approximately 30 joules of energy to start the human heart and improved energy storage dielectrics will allow for the further miniaturization of these devices, which are currently the size of a pocket watch. Due to their fast discharge (less than one second), capacitors typically supply high power densities and small energy storage densities compared to batteries or supercapacitors.

Unlike batteries that store energy via a chemical mechanism, capacitors store energy in an electrostatic field that induces positive and negative charges on the plates of the device. The maximum energy that can be stored by a dielectric is determined by the relative permittivity and breakdown strength of a material. Energy storage density for a linear dielectric is calculated using equation 1:

$$J = \int_{P_o}^{P_{max}} E dP \approx \frac{\varepsilon_o \varepsilon_r E^2}{2} \quad (1)$$

in which J is the energy density, E is the electric field sustained by the dielectric, P is the induced polarization of the dielectric, $P_{max}$ is the maximum induced polarization, $P_o$ is the polarization at zero electric field, $\varepsilon_r$ is the relative permittivity of the material, and $\varepsilon_o$ is the permittivity of free space. Thus, an ideal material for dielectric energy storage would possess a high relative permittivity, high breakdown strength, and a low loss tangent under high applied electric fields. It is appreciated that due to the squared dependence of energy storage density on applied electric field, it is advantageous to maximize the breakdown strength of these materials.

FIG. 1 shows the energy storage density as a function of maximum processing temperature for several heretofore known materials. FIG. 1 includes both lead-containing and lead-free oxide thin films, as well as high energy density polymers, composite materials, and several glasses. To achieve a high energy storage density, these materials often exhibit a compromise between the relative permittivity and breakdown strength. For example, an energy density in excess of 35 J/cm$^3$ using an alkali-free glass with a relative permittivity of 6 and a breakdown strength of 12 MV/cm is shown, as well as an energy density of 22 J/cm$^3$ for lead lanthanum zirconium titanate (PLZT) films with a relative permittivity of 1100 and a breakdown strength of 1.6 MV/cm. By demonstrating an electrode with an increased breakdown strength of 4.3 MV/cm, PLZT films on nickel foils achieved a best-case energy density of 85 J/cm$^3$, the maximum value reported in the literature. The loss tangent for these PLZT films was between 0.05 and 0.08.

FIG. 2 shows the breakdown strength as a function of relative permittivity for several materials reported to have a high energy storage density. As seen in FIG. 2, many materials fall above the historical "best-fit" line, primarily due to increases in the maximum achievable breakdown strength of the material.

Historically, lead-containing materials have demonstrated superior properties, such as a larger dielectric constant, piezoelectric coefficient, and energy storage density. However, human health and environmental concerns surrounding lead-based materials have led researchers to target lead-free materials for applications ranging from energy storage to piezoelectric devices. Therefore, an improved lead-free dielectric material for use in capacitors would be desirable.

SUMMARY

In one embodiment, thin films of bismuth zinc niobate with the composition $Bi_{1.5}Zn_{0.9}Nb_{1.5}O_{6.9}$ are provided. The films are lead free and have a single phase cubic pyrochlore crystal structure. Also, the single phase cubic pyrochlore bismuth zinc niobate material has a relative permittivity of 145. The thin films can have: a loss tangent of 0.00065 and a maximum applied electric field of at least 4.0 MV/cm, preferably at least 4.5 MV/cm at 1 kHz; and/or a loss tangent of 0.0065 and a maximum applied electric field of at least 4.5 MV/cm, preferably at least 5.0 MV/cm at 100 Hz or 10 kHz.

When the thin films are at room temperature (25° C.), the material has a maximum energy storage of at least 50 J/cm$^3$ at 10 kHz and at least 40 J/cm$^3$ at 100 Hz. In addition, the thin films have a maximum energy storage of at least 22.5 J/cm$^3$ at 10 kHz and at least 20 J/cm$^3$ at 100 Hz at 200° C. Finally, the single phase dielectric material has a DC breakdown strength of at least 3 MV/cm and leakage current of less than 10$^{-9}$ A/cm$^2$.

A process for making the single phase lead-free dielectric material is also provided. The process includes preparing separate precursors of bismuth, zinc, and niobium without the use of 2-methoxyethanol and pyridine. Each of the precursors are chelated, e.g. using citric acid, and the chelated precursors are mixed together to form a bismuth-zinc-niobium mixture. The mixture is dried and then pyrolyzed to form a single phase cubic pyrochlore bismuth zinc niobate having a chemical stoichiometry of $Bi_{1.5}Zn_{0.9}Nb_{1.5}O_{6.9}$.

In some instances, the niobium precursor contains niobium ethoxide and anhydrous ethylene glycol, the zinc precursor contains zinc acetate dihydrate and ethylene glycol, and/or the bismuth precursor contains bismuth nitrate pentahydrate and ethylene glycol. Also, the bismuth-zinc-niobium mixture can be dried at a temperature greater than 200° C. and the dried mixture can be pyrolyzed at a temperature greater than 300° C. In addition, the dried mixture can be subjected to a pre-pyrolyzing step/treatment at a temperature greater than 250° C. to promote thin film densification.

In another embodiment, a tantalum-modified single phase lead-free dielectric material is provided. The material has a chemical composition/formula of $Bi_{1.5}Zn_{0.9}Nb_{(1.5-x)}Ta_{(x)}O_{6.9}$ with $0<x\leq0.23$. The dielectric material when x=0.15 has a relative permittivity of approximately 122 and a loss tangent of 0.0008 at a frequency of 10 kHz. In some instances, the dielectric material has a maximum applied electric field of at least 5.0 MV/cm at 10 kHz, preferably at least 5.25 MV/cm, and even more preferably at least 5.5 MV/cm. At 100 Hz, the tantalum-modified dielectric material has a maximum applied electric field of at least 4.7 MV/cm, preferably 5.0 MV/cm, and more preferably 5.2 MV/cm. Finally, at 1 kHz the tantalum-modified dielectric material has a maximum applied electric field of at least 4.5 MV/cm, preferably 4.75 MV/cm, and more preferably 5.0 MV/cm.

Regarding maximum energy storage density, the dielectric material exhibits at least 60 $J/cm^3$, preferably at least 63 $J/cm^3$, and more preferably at least 66 $J/cm^3$ at 25° C. and 10 kHz. At 1 kHz, and 25° C., the single phase tantalum-modified dielectric material has a maximum energy storage density of at least 50 $J/cm^3$ and preferably at least 54 $J/cm^3$.

The dielectric material also exhibits excellent maximum energy storage density at elevated temperatures. For example, at 200° C. and 10 kHz, the dielectric material has a maximum energy storage density of at least 30 $J/cm^3$, preferably at least 34 $J/cm^3$ and more preferably at least 37 $J/cm^3$ at 10 kHz. For a frequency of 1 kHz, and at 200° C., the dielectric material has a maximum energy storage density of at least 25 $J/cm^3$, preferably at least 30 $J/cm^3$, and more preferably at least 33 $J/cm^3$.

In yet another embodiment, a manufacturing process for the tantalum-modified lead-free dielectric material is provided. The process includes manufacture of thin films of a nanocomposite that includes amorphous bismuth zinc niobate tantalate dielectric material with nanoparticles of bismuth oxide. The thin films can be fabricated on polymeric substrates using a chemical solution deposition technique. For example, solution chemistry based upon a Pechini method produced thin films of a nanocomposite that included an amorphous matrix and nanoparticles of $Bi_2O_3$ on platinized polyimide-coated silicon wafers. Precursors used for manufacture of the nanocomposite included bismuth nitrate pentahydrate, zinc acetate dihydrate, niobium ethoxide, and tantalum ethoxide. A citric acid chelating agent and an anhydrous ethylene glycol solvent were employed for dissolution of the metal precursors. The bismuth nitrate pentahydrate, zinc acetate dihydrate, niobium ethoxide, and tantalum ethoxide were separately mixed in ethylene glycol for 30 minutes at 80° C. to create homogeneous alcoholic solutions. In addition, the solution was batched with the composition of $Bi_{1.5}Zn_{0.9}Nb_{1.35}Ta_{0.15}O_{6.9}$. The citric acid was added to each cationic solution using a 1:1 ratio of citric acid to organometallic precursor and then stirred on an 80° C. hotplate for 2 hours to allow for chelation of the metal atoms. Following chelation, the zinc, tantalum, and niobium solutions were combined and stirred for 2 hours at 80° C. to promote intimate mixing. Finally, the bismuth precursor was added to the solution and the final solution was stirred at 80° C. for 1 hour to afford for the solution to homogenize. The final molarity of the solution was 0.15 M.

The platinized polyimide-coated silicon wafers were pre-conditioned on a hotplate and the solution was spin coated on the wafers with multiple treatments used to produce thicknesses in the range of 150 nm. The thin films with a starting composition of amorphous $Bi_{1.5}Zn_{0.9}Nb_{1.35}Ta_{0.15}O_{6.9}$ with nanoparticles of $Bi_2O_3$ in an amorphous matrix exhibited a relative permittivity of approximately 55 and low dielectric losses on the order of 0.03. Polarization versus electric field behavior of the thin films under an alternating current (AC) electric field of 3.8 MV/cm at a frequency of 1 kHz showed a hysteresis loop which confirmed the nanocomposite to be a slightly nonlinear dielectric with low losses. The breakdown strength of the films was approximately 3.8 MV/cm for frequencies of 1 kHz and 10 kHz. Finally, the films had a room temperature energy storage density of approximately 40 $J/cm^3$. After establishing a baseline of dielectric properties, crack-free released films underwent compressive and tensile flexible testing. After bending the films around a minimum bend diameter of 7 mm (which corresponds to a maximum strain level of 0.10%) for 30,000 mechanical bending cycles, the dielectric properties and energy storage density of the films was unchanged, indicating that nanocomposite bismuth zinc niobate tantalate films may be suitable for flexible energy storage applications.

COLOR DRAWINGS

The patent or patent application file contains at least one drawing executed in color. Copies of this patent or patent application publication with color drawing(s) will be provided by the Office upon request and payment of the necessary fee.

DETAILED DESCRIPTION

First Embodiment

Figure 1:
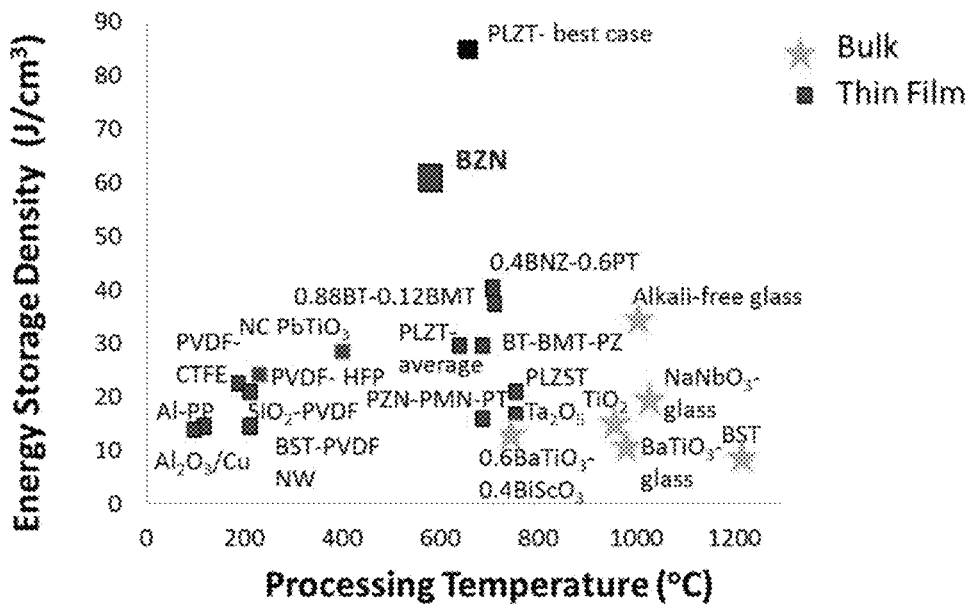
FIG. 1 is graphical plot of energy storage density as a function of maximum processing temperature for several prior art materials.
Figure 2:
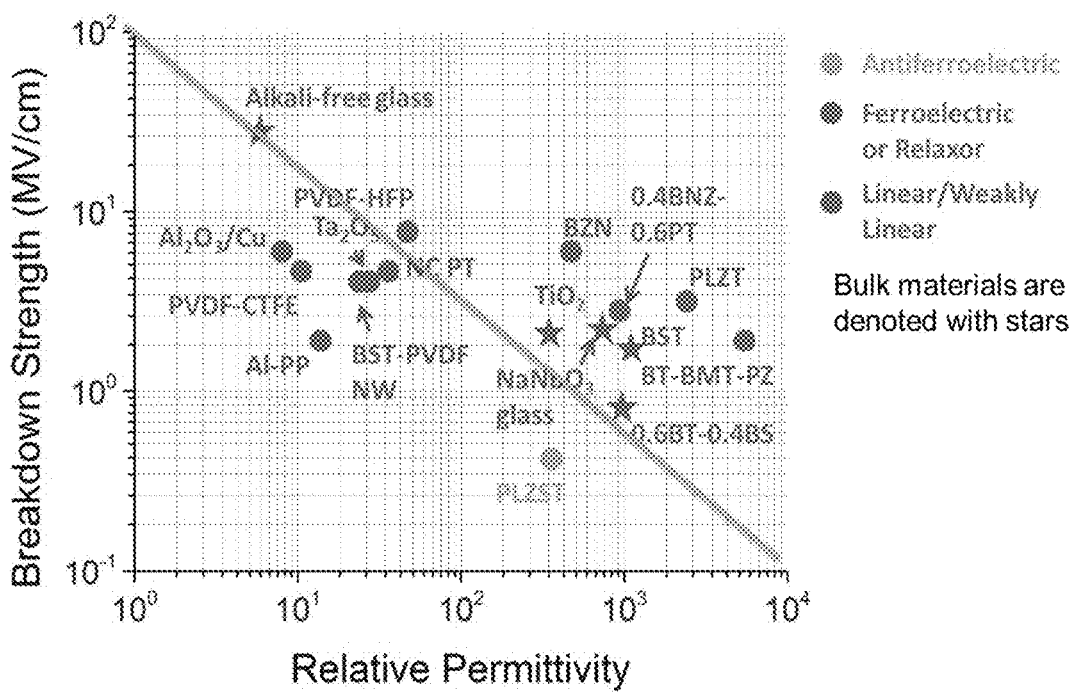
FIG. 2 is graphical plot of breakdown strength as a function of relative permittivity for several dielectric materials with a high energy density.

Thin films of cubic pyrochlore bismuth zinc niobate (BZN), a lead-free dielectric, are provided. The BZN thin films were fabricated using a solution chemistry based upon the Pechini method. Scanning electron microscopy (SEM) confirmed that the films are smooth and mostly dense.

The thin films were a single phase cubic pyrochlore bismuth zinc niobate and had a relative permittivity of 145. In some instances, the thin films can have: a loss tangent of 0.00065 and a maximum applied electric field of at least 4.0 MV/cm, preferably at least 4.5 MV/cm at 1 kHz; and/or a loss tangent of 0.0065 and a maximum applied electric field of at least 4.5 MV/cm, preferably at least 5M MV/cm at 100 Hz or 10 kHz.

When the thin films are at room temperature (25° C.), the material has a maximum energy storage of at least 50 J/cm³ at 10 kHz and at least 40 J/cm³ at 100 Hz. In addition, the thin films have a maximum energy storage of at least 22.5 J/cm³ at 10 kHz and at least 20 J/cm³ at 100 Hz at 200° C. Finally, the single phase dielectric material has a DC breakdown strength of at least 3 MV/cm and leakage current of less than $10^{-9}$ A/cm².

A process for making the single phase lead-free dielectric material is also provided. The process includes preparing separate precursors of bismuth, zinc, and niobium without the use of 2-methoxyethanol and pyridine. Each of the precursors are chelated, e.g. using citric acid, and the chelated precursors are mixed together to form a bismuth-zinc-niobium mixture. The mixture is dried and then pyrolyzed to form a single phase cubic pyrochlore bismuth zinc niobate having a chemical stoichiometry of $Bi_{1.5}Zn_{0.9}Nb_{1.5}O_{6.9}$.

In some instances, the niobium precursor contains niobium ethoxide and anhydrous ethylene glycol, the zinc precursor contains zinc acetate dihydrate and ethylene glycol, and/or the bismuth precursor contains bismuth nitrate pentahydrate and ethylene glycol. Also, the bismuth-zinc-niobium mixture can be dried at a temperature greater than 200° C. and the dried mixture can be pyrolyzed at a temperature greater than 300° C. In addition, the dried mixture can be subjected to a pre-pyrolyzing step/treatment at a temperature greater than 250° C. to promote thin film densification.

In a preferred embodiment, the films exhibit a dielectric constant of approximately 145±5, a low dielectric loss of 0.00065±0.0001, and a room-temperature, 1 kHz maximum field of approximately 4.5 MV/cm. At frequencies of 100 Hz and 10 kHz, maximum field sustained by the material increased to 5 MV/cm, although the dielectric loss increased to 0.0065±0.001. The leakage current is approximately $10^{-9}$ $A/cm^2$, with a DC breakdown strength of between 3 and 4 MV/cm. At a measurement frequency of 10 kHz, the maximum energy storage density was ~60.8±2.0 $J/cm^3$, and at a measurement frequency of 100 Hz, the maximum energy storage was ~46.7±1.7 $J/cm^3$. As temperature was increased to 200° C., the breakdown strength of the films decreased, while the loss tangent remained modest. At 200° C. and a measurement frequency of 100 Hz, the maximum energy storage density was ~23.1±0.8 $J/cm^3$, and at 10 kHz, the maximum energy storage density was ~27.3±1.0 $J/cm^3$.

In order to better teach the disclosure, but not limit its scope in any way, one or more examples are provided and discussed below.

Cubic pyrochlore $Bi_{1.5}Zn_{0.9}Nb_{1.5}O_{6.9}$ thin films were prepared on platinized silicon wafers via a chemical solution deposition method. Solutions were prepared using a modified Pechini method to avoid the use of 2-methoxyethanol and pyridine. The precursors used were bismuth nitrate pentahydrate, zinc acetate dihydrate, and niobium ethoxide (Sigma-Aldrich). The chelating agent was citric acid (Sigma-Aldrich), and the solvent employed for the dissolution of the metal precursors was anhydrous ethylene glycol (≥99.8%, Sigma-Aldrich).

Bismuth nitrate pentahydrate, zinc acetate dihydrate, and niobium ethoxide were separately mixed in ethylene glycol for 30 minutes at 80° C. to create homogeneous alcoholic solutions. Zinc acetate dihydrate was batched with a 40% excess in accordance with the work by Nino that reported suppression of the formation of $BiNbO_4$ secondary phases when excess ZnO was used in the fabrication of bulk bismuth zinc niobate.

Citric acid was added to each cationic solution, and then stirred on an 80° C. hotplate for two hours to allow for chelation of the metal atoms. Following chelation, the zinc and niobium solutions were combined and stirred for two hours at 80° C. to promote intimate mixing. Finally, the bismuth precursor was added to the solution; the solution was stirred at 80° C. for one hour to allow the solution to homogenize. The final molarity of the solution was 0.15 M. The solution preparation is shown schematically in FIG. 3.

Figure 4:
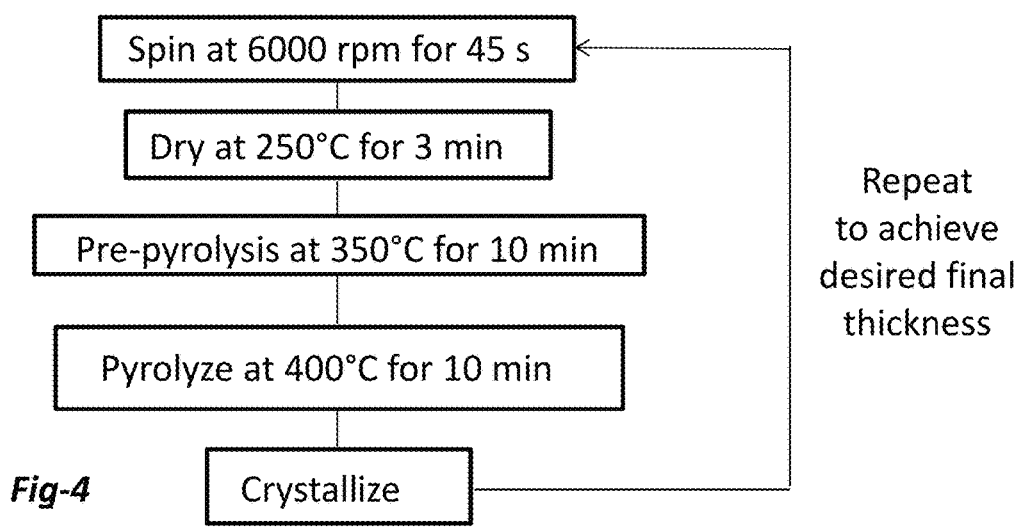
FIG. 4 is an illustrative flowchart showing the production of bismuth zinc niobate thin films.

The solution was spin coated at 6000 rpm for 45 seconds on a platinum-coated silicon wafer (Pt (100 nm)/Ti (20 nm)/$SiO_2$ (500 nm)/Si, (NOVA Electronic Materials, Flower Mound, Tex.). The substrate was dried on a hotplate at 250° C. for three minutes, prepyrolyzed on a second hotplate at 350° C. for ten minutes, then pyrolyzed for ten minutes at 400° C. to remove all organic species and densify the film. The film was crystallized in a rapid thermal anneal system (RTP-6005, Modular Process Technology Corp., San Jose, Calif.) for two minutes at 600° C. The film deposition process is shown schematically in FIG. 4 and the process with four sequential heat treatments was repeated several times to build up film thickness. For example, a film thickness was typically 200 nm after four layers were deposited.

Optimal pyrolysis temperatures for the solution were determined using thermal gravimetric analysis (2050 TGA, TA Instruments, New Castle, Del.) in an inert argon atmosphere. The ramp rate was 5° C./minute.

Analysis of the organic content of the films was done using a Fourier transform infrared microscope (Bruker Hyperion 3000 Microscope, Bruker, Billerica, Mass.). The microscope was used in specular reflectance mode with a 15× objective and an analysis area of 150 µm×150 µm. A platinized silicon substrate was used as a reference so that absorbance spectra could be calculated and analyzed.

The phase content of the film was analyzed with an x-ray diffractometer (Empyrean, PANalytical, Almelo, The Netherlands) configured in focusing geometry, or powder mode, using Cu K$\alpha$ radiation. Patterns were collected over a 2$\theta$ range spanning from 10° to 73°. The instrument step size was 0.02°, and a step was taken every 100 seconds.

Film morphology was determined using scanning electron microscopy. A field emission scanning electron microscope (Leo 1530, LEO Electron Microscopy Ltd., Cambridge, England) was used at an accelerating voltage of 5.00 kV for secondary electron imaging. Samples were cleaved to allow cross-sectional images to be taken.

To measure the electrical properties of the films, an array of circular electrodes with diameters ranging from 200 µm to 2 mm were patterned on the film using a double layer lithography process. After lithographic patterning, 500 Å of platinum were sputtered (CMS-18 Sputter System, Kurt J. Lesker Company, Pittsburgh, Pa.) onto the film; lift-off processing was used to pattern the top electrodes. The bottom platinum electrode was exposed using a 30% aqueous HF solution to remove the oxide film. The film was annealed a final time at 600° C. for two minutes in a rapid thermal annealing system to improve the film-top electrode interface. Film thickness was measured using a profilometer (Alpha-Step 500 Surface Profilometer, Tencor, Portsmouth, N.H.).

The permittivity and dielectric loss tangent of the bismuth zinc niobate films were measured with an LCR meter (Hewlett-Packard 4284A Precision, Agilent Technologies, Inc., Palo Alto, Calif.) at an AC oscillation voltage of 0.03 V and a frequency range from 100 Hz to 10 kHz. Polarization-electric field behavior was determined using a multiferroic analyzer (Precision Multiferroic, Radiant Technologies, Inc., Albuquerque, N. Mex.).

Figure 5:
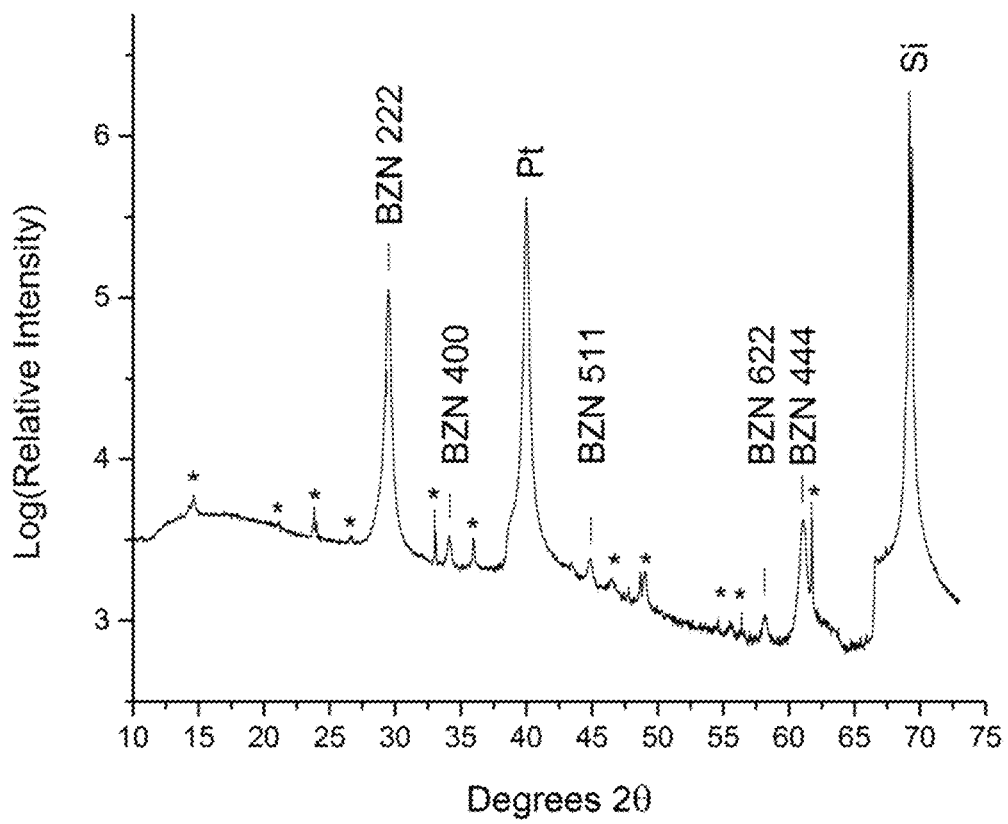
FIG. 5 is an x-ray diffraction pattern of cubic pyrochlore $Bi_{1.5}Zn_{0.9}Nb_{1.5}O_{6.9}$ deposited on a platinized silicon substrate according to an embodiment of the present disclosure where the peaks marked with an asterisk (*) are due to the substrate or are diffraction from X-ray wavelengths other than Cu-Kα.

Crystalline $Bi_{1.5}Zn_{0.9}Nb_{1.5}O_{6.9}$ films were prepared using the method described in the previous section and analyzed using XRD to verify the phase content of the films. The XRD pattern obtained for these films is shown in FIG. 5. The diffraction peaks are consistent with the cubic pyrochlore structure of bismuth zinc niobate (PDF #04-009-5437, 2002). There are no peaks that correspond to the formation of a secondary phase.

The development of pores in chemical solution deposited films with high molecular weight precursor solutions is a challenge that inhibits the growth of fully dense films. During heat treatments of the film, the organic groups in the deposited solution are volatized. During the viscous sintering process that accompanies film pyrolysis, these gaseous species may coalesce. As these pockets of gas escape from the collapsing structure, they leave pores or channels through the film. In a solution with large organic clusters, this is especially problematic, as the organics typically require both higher volatization temperatures and are sterically bulky, leaving behind a larger open volume upon evaporation. These regions of open volume must be collapsed prior to crystallization to achieve dense films.

In these films, is critical to control the ratio of the chelating complex to cationic species, thereby modulating the extent of metal chelation in the solution. If this ratio is not sufficiently high, precipitation of the solution will occur; conversely if this ratio is too high, then complete removal of organics from the film can be difficult. It has been reported that higher temperatures are required to combust the polymer network of the solution and that longer processing times are necessary to remove organic material. In the bismuth zinc niobate system, niobium ethoxide is especially moisture sensitive, and bismuth nitrate pentahydrate cannot be dehydrated; an optimized molar ratio of citric acid must be used in order to stabilize niobium ethoxide against hydrolysis by the hydrated metal salts. In this study, a 3:1 molar ratio of citric acid to metal cations was used.

Figure 3:
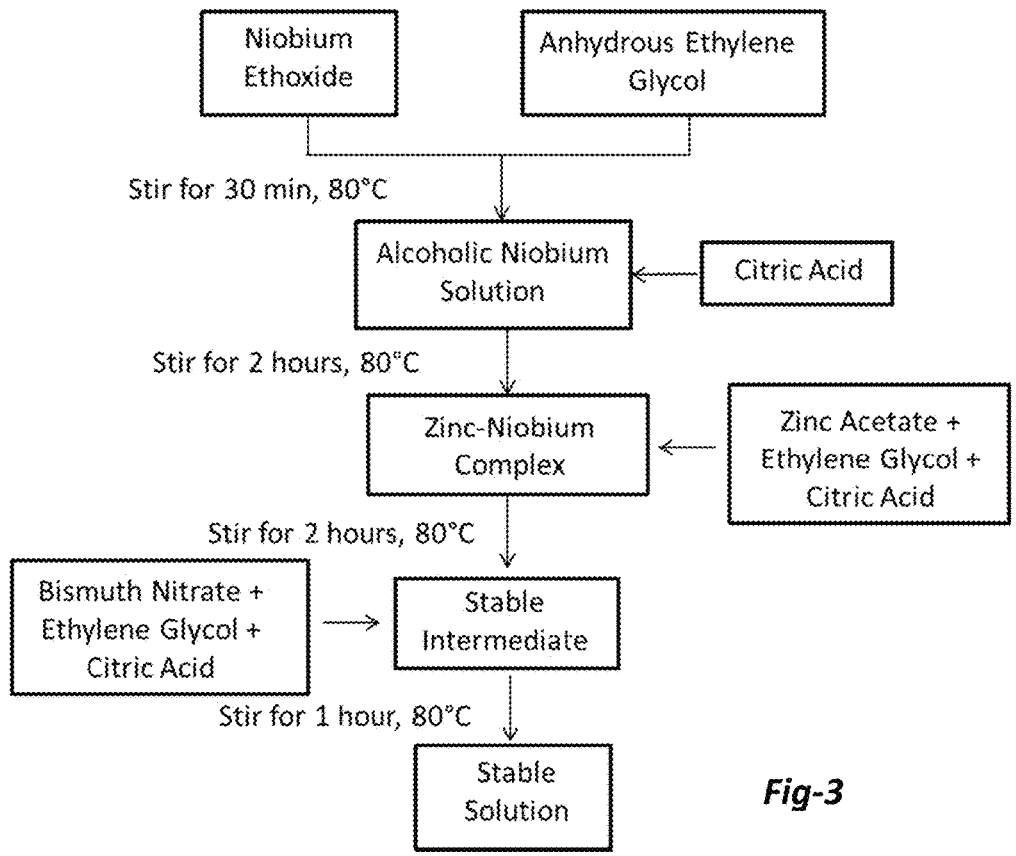
FIG. 3 is an illustrative flowchart showing the preparation of a solution used to deposit bismuth zinc niobate thin films.
Figure 6A:
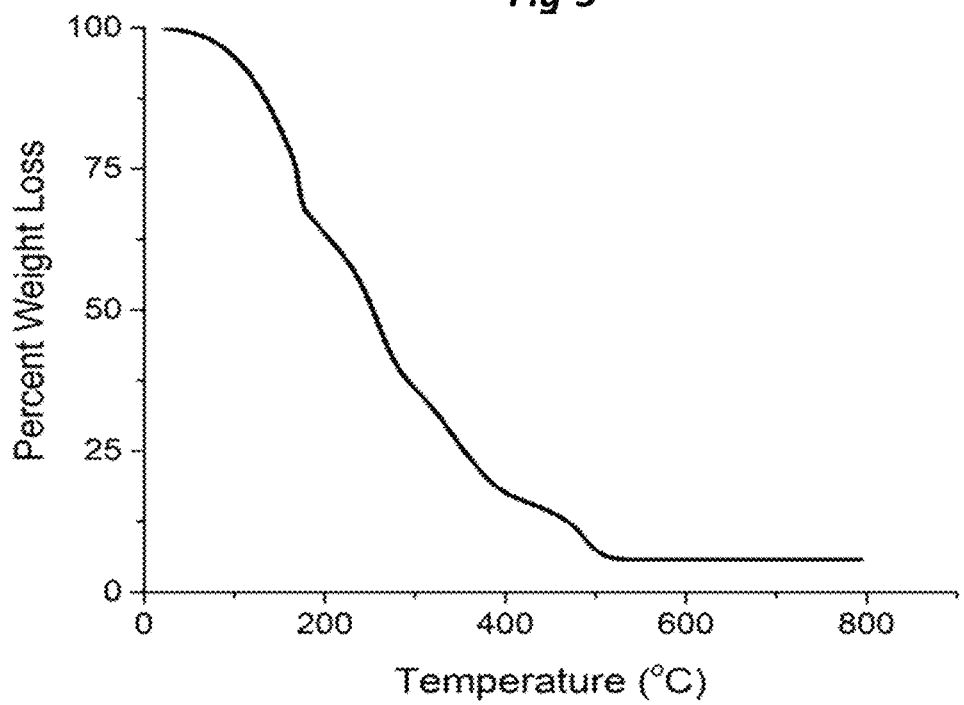
FIG. 6(a) is a graphical plot of a thermal gravimetric analysis of the bismuth zinc niobate solution used for thin film deposition.
Figure 6B:
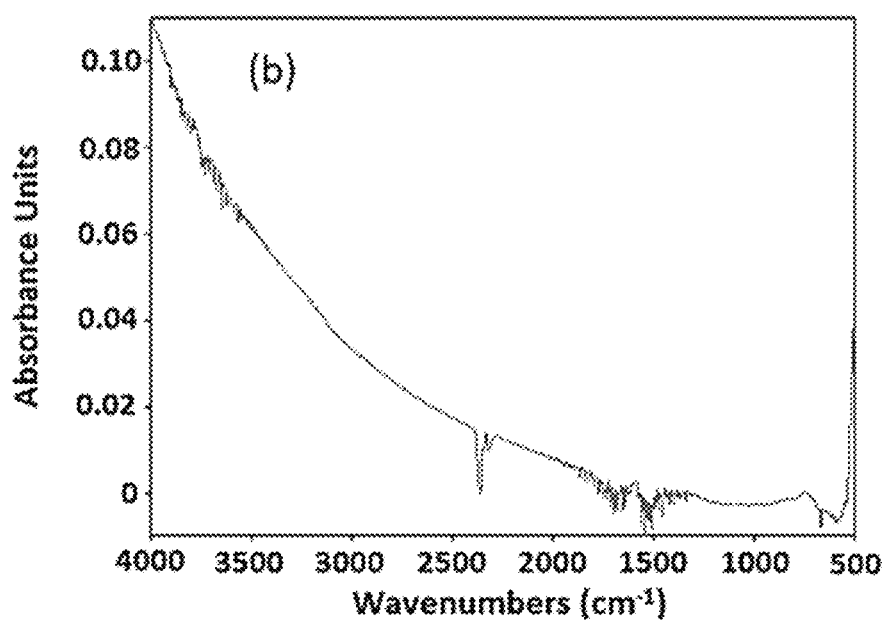
FIG. 6(b) is a graphical plot of an infrared spectrum of the bismuth zinc niobate thin films after pyrolysis.

FIG. 6(a) shows the thermal gravimetric analysis of the solution described in FIG. 3. It can be seen that approximately half of the weight loss is complete when the solution reaches 200° C., and that by 400° C., weight loss is nearly complete. The drying temperature was chosen to be 250° C. to facilitate the removal of water and organic species with a relatively lower boiling point. The pyrolysis temperatures were chosen to be 350° C. and 400° C. to facilitate complete removal of organics and densification prior to crystallization. When the 350° C. pyrolysis step is omitted, extensive porosity developed in the film. It is likely that the use of two pyrolysis steps slows the pyrolysis process, allowing the removal of organic species, followed by the rearrangement of molecular groups into a dense film via a viscous sintering process. FIG. 6(b) shows an infrared absorption spectrum taken after pyrolysis of the film, prior to crystallization. FIG. 6(b) confirms that, within the routine 0.1 wt % detection limits of FTIR, the organic species are removed from the film prior to crystallization.

Figure 7:
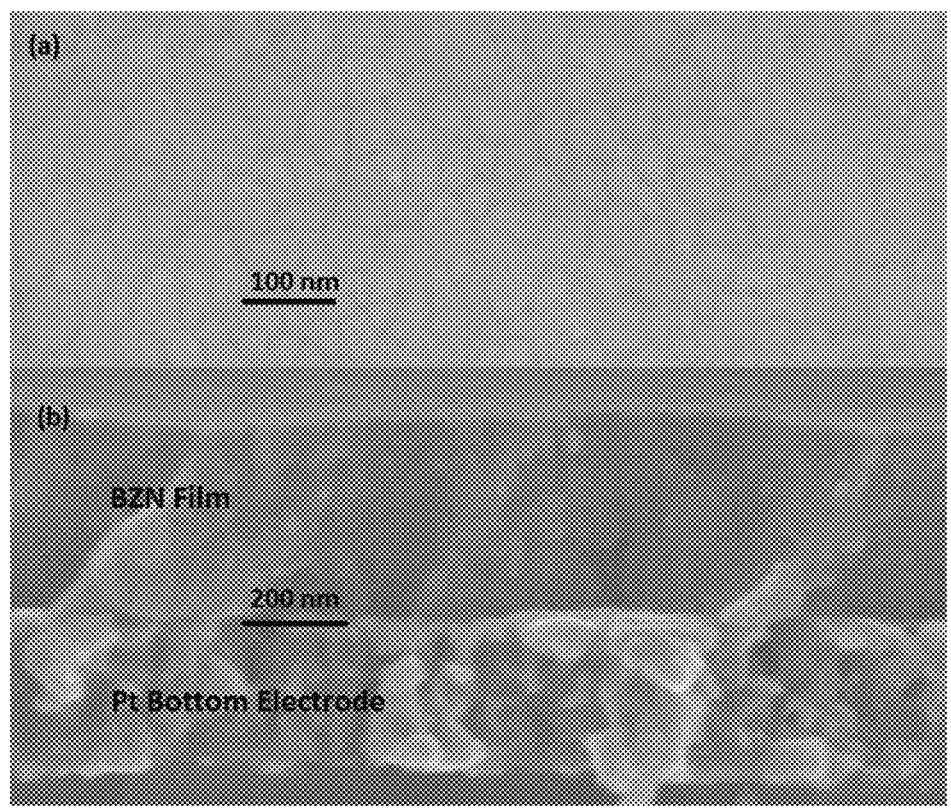
FIG. 7 is an scanning electron microscopy (SEM) image of a mostly dense $Bi_{1.5}Zn_{0.9}Nb_{1.5}O_{6.9}$ thin film surface (labeled '(a)') and cross-section (labeled '(b)') produced according to an embodiment of the present disclosure.

The top half of FIG. 7 (labeled '(a)') shows an SEM image of the predominantly dense bismuth zinc niobate film surface. The film has small grains that are several tens of nanometers in lateral size. The bottom half of FIG. 7 (labeled '(b)') shows a cross-section of the film on a columnar platinum bottom electrode. A modest amount of porosity exists between layers of the final film. The interface between the platinum substrate and the bismuth zinc niobate film is smooth, which minimizes electric field amplifications that are typical of non-uniform interfaces.

Figure 8:
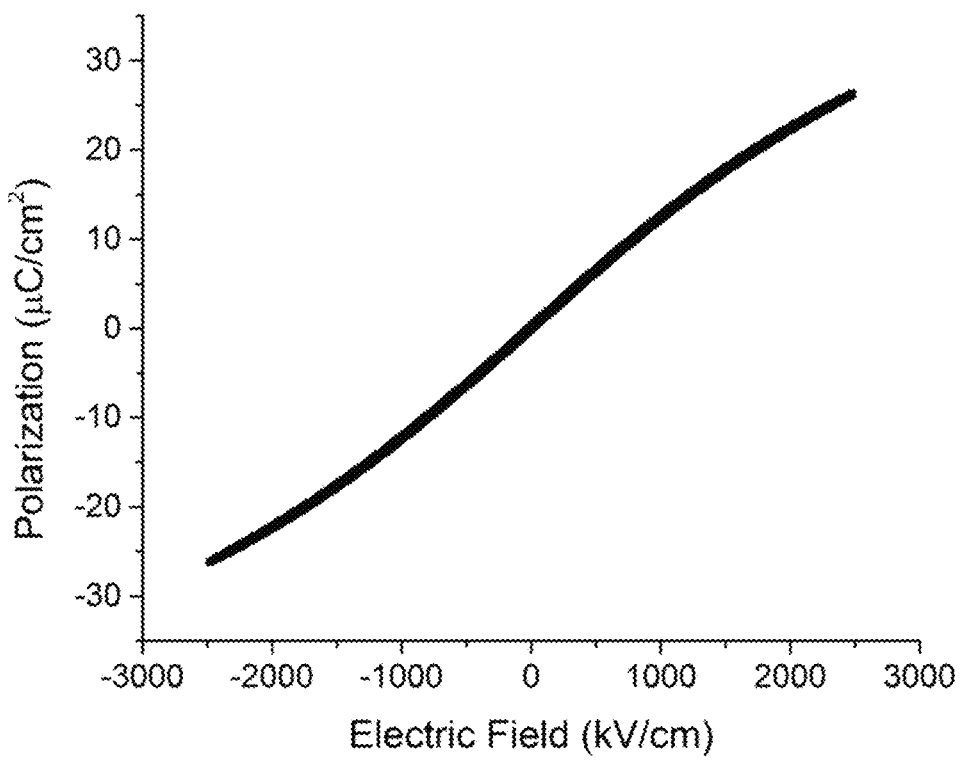
FIG. 8 is a graphical plot of polarization versus electric field illustrating the polarization-electric field behavior of cubic pyrochlore $Bi_{1.5}Zn_{0.9}Nb_{1.5}O_{6.9}$ produced according to an embodiment of the present disclosure and illustrating that the cubic pyrochlore bismuth zinc niobate is a slightly nonlinear and low loss dielectric.

FIG. 8 shows the polarization versus electric field behavior for cubic pyrochlore bismuth zinc niobate under an AC electric field of 2.5 MV/cm at a measurement frequency of 1 kHz. The hysteresis loop shows BZN to be a slightly nonlinear, low loss dielectric. The relative permittivity of the films is 145 and the loss tangent is 0.00065. This low loss tangent is comparable to those exhibited by sputtered $Bi_{1.5}Zn_{0.5}Nb_{1.5}O_{6.5}$ films, and approximately an order of magnitude lower than most films fabricated by chemical solution deposition. The tunability of the films was calculated using equation 2:

$$\text{Tunability} = \frac{\varepsilon_{r,max} - \varepsilon_{r,min}}{\varepsilon_{r,max}} \cdot 100 \quad (2)$$

in which $\varepsilon_{r,max}$ and $\varepsilon_{r,min}$ are the maximum and minimum relative permittivity values for the film. The cubic pyrochlore bismuth zinc niobate films examined here exhibit a room temperature tunability of 42% at DC fields of 2.5 MV/cm and an AC oscillation voltage of 0.03 V.

Figure 9A:
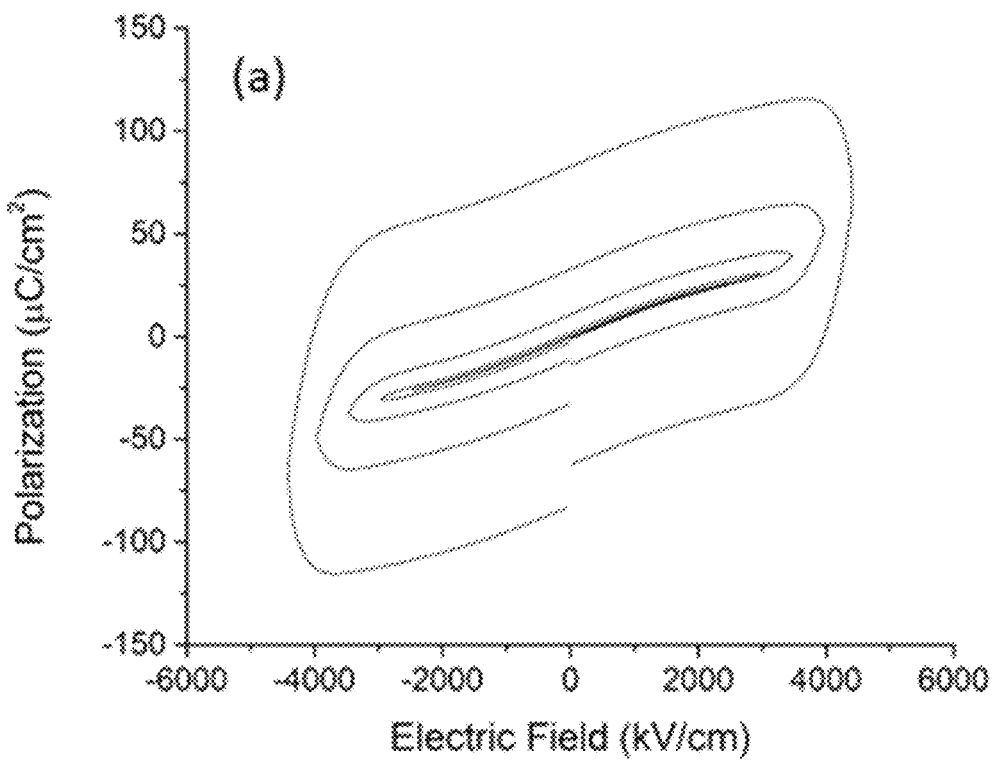
FIG. 9(a) is a graphical plot of polarization versus electric field illustrating the polarization-electric field behavior of bismuth zinc niobate films and the highest field sustained by the material is dependent on the measurement frequency with a maximum sustained electric field of 4.5 MV/cm at 1 kHz.
Figure 9B:
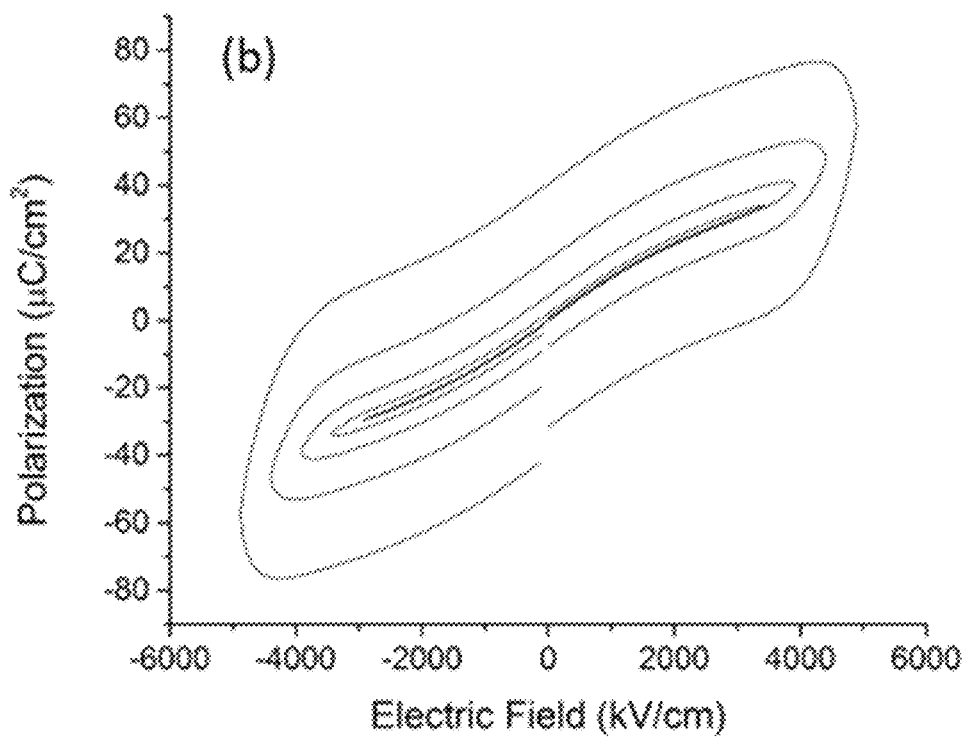
FIG. 9(b) is a graphical plot of polarization versus electric field illustrating the polarization-electric field behavior of bismuth zinc niobate films and the highest field sustained by the material is dependent on the measurement frequency with a maximum sustained electric field of 5 MV/cm at 10 kHz.

FIGS. 9(a) and 9(b) show polarization-electric field hysteresis loops at 1 kHz and 10 kHz, respectively, for the highest fields sustained by the bismuth zinc niobate films. At the measurement frequency of 1 kHz, the material will sustain an electric field of 4.5 MV/cm, and for measurement frequencies of 100 Hz (not shown) and 10 kHz, the films sustain fields of 5.1 MV/cm. Under a frequency of 10 Hz (not shown), the films reached catastrophic electrical breakdown at applied fields of 5.2 MV/cm. This breakdown strength exceeds those reported in the literature for BZN. The width of the hysteresis loops increases as the material is swept to higher electric fields, which is indicative of an increase in the dielectric loss of the film. When the electric field was removed from the film, the material recovered.

Figure 10:
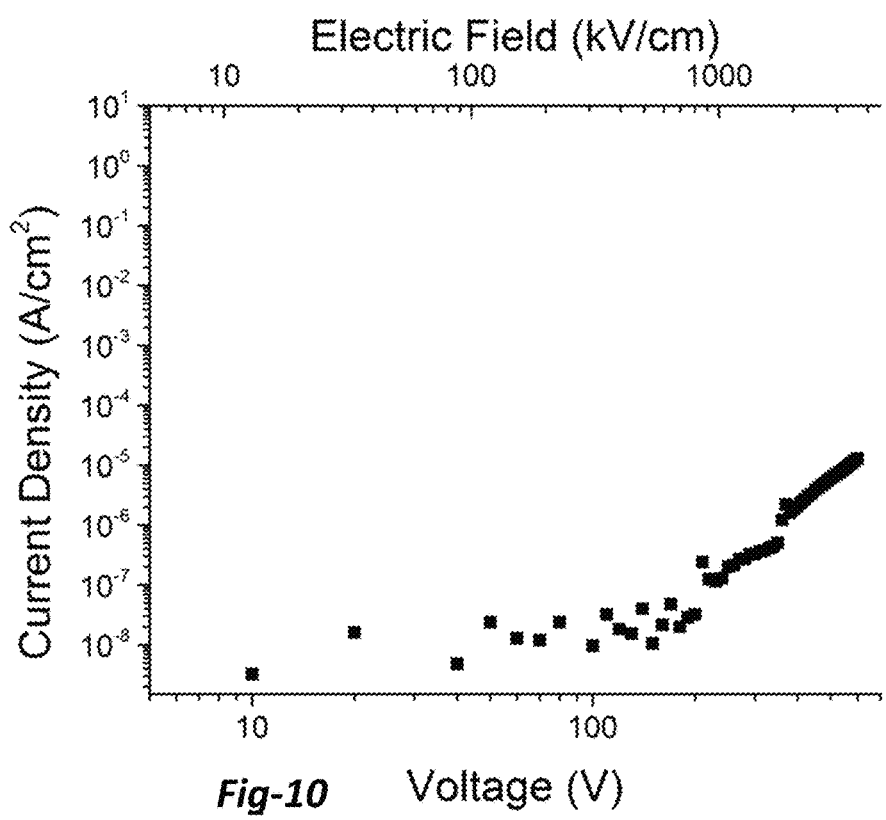
FIG. 10 is a graphical plot of current density versus voltage for a 1.6 μm film of cubic pyrochlore bismuth zinc niobate and illustrating that such relatively thick films can sustain 600 V without catastrophic breakdown.

It is appreciated that power inverters and DC-links in batteries of hybrid/electric vehicles require capacitive materials that can sustain 400 to 600 V without the occurrence of breakdown. As such, a thin film of cubic pyrochlore bismuth zinc niobate with a thickness of 1.6 μm was deposited for high voltage tests. FIG. 10 shows the current-voltage characteristics of the thick film of cubic pyrochlore bismuth zinc niobate. As can be seen in the figure, the film can withstand a voltage of 600 V without the occurrence of catastrophic breakdown, making cubic pyrochlore bismuth zinc niobate suitable for power inverter and battery applications in hybrid/electric vehicles.

Figure 11:
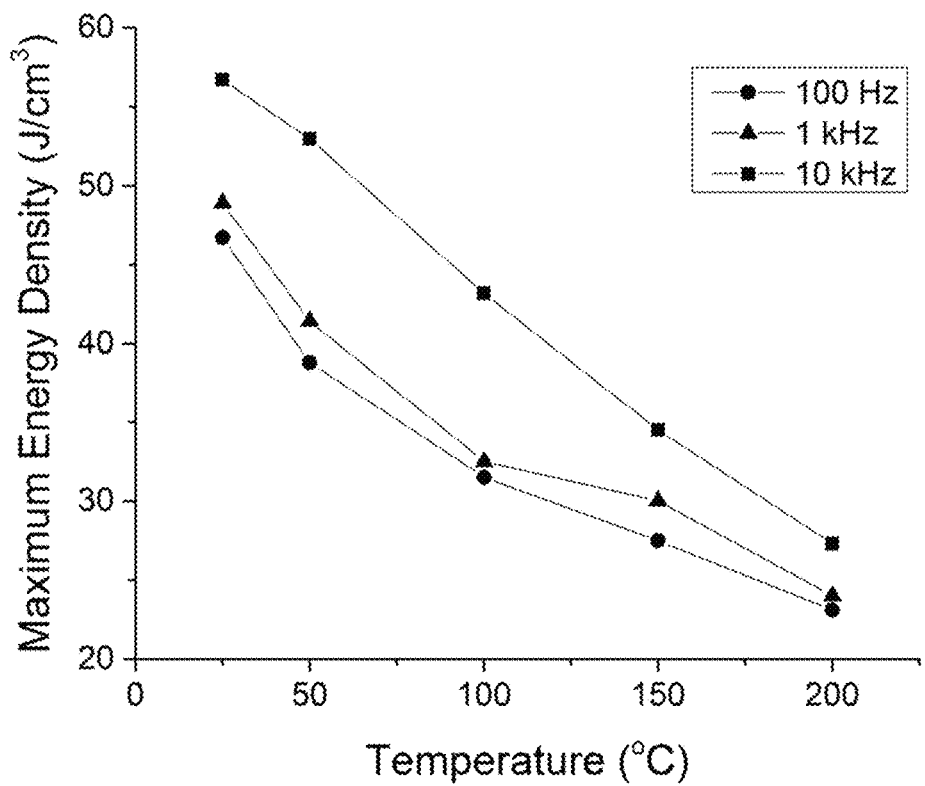
FIG. 11 is a graphical plot of maximum energy density versus temperature for bismuth zinc niobate thin films produced according to an embodiment of the present disclosure and subjected to frequencies of 100 Hz, 1 kHz, and 10 kHz.

The high breakdown strength and low losses in the material contribute to a high energy storage density. FIG. 11 shows the maximum energy storage density achieved for the bismuth zinc niobate films as a function of temperature and measurement frequency. The maximum energy storage densities achieved at each of the three measurement frequencies is comparable, making bismuth zinc niobate a suitable candidate for integration into energy storage devices for a variety of applications. At 100 Hz, the maximum energy storage density for bismuth zinc niobate is 46.7 J/cm$^3$. At 1 kHz, the maximum energy storage density is 48.9 J/cm$^3$, and at 10 kHz, the maximum energy storage density is 56.7 J/cm$^3$.

Figure 12:
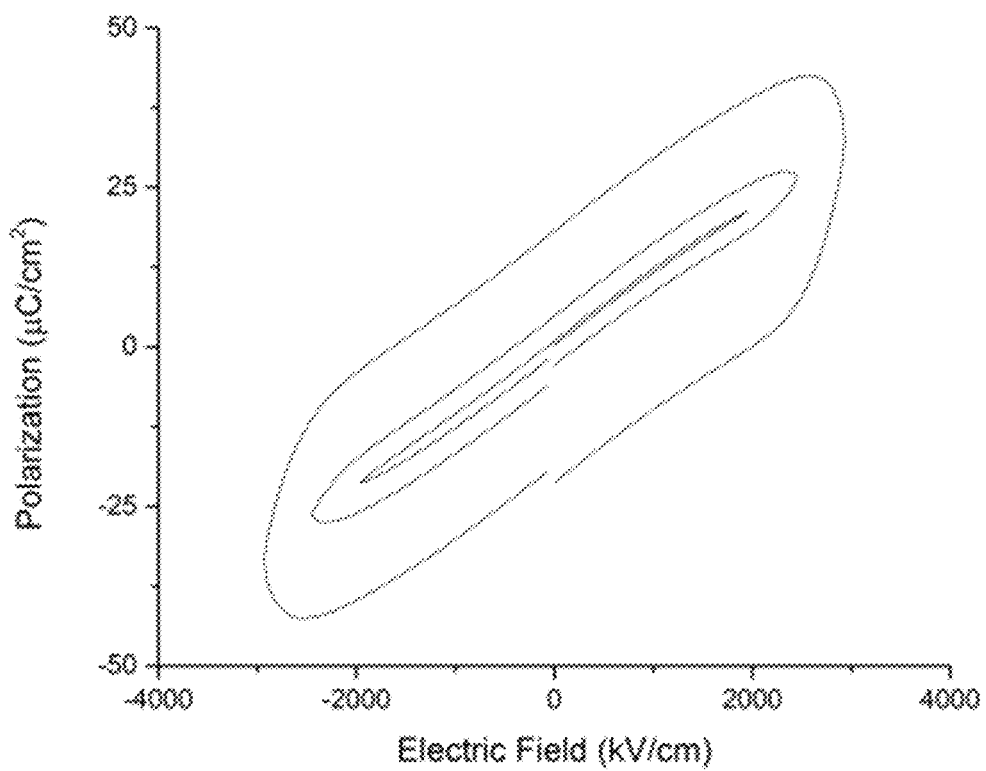
FIG. 12 is graphical plot of polarization versus electric field at 200° C. and 10 kHz for bismuth zinc niobate thin films produced according to an embodiment of the present disclosure and illustrating a maximum energy storage density of 27.3 J/cm³.

Furthermore, the energy storage density remains high as the temperature is increased; for all three measurement frequencies, the maximum energy storage density exceeds 20 J/cm$^3$ at 200° C. This is higher than the maximum energy storage density reported for any material at 200° C. FIG. 12 shows the 200° C. polarization-electric field hysteresis loop for bismuth zinc niobate at a measurement frequency of 10 kHz; the maximum energy storage density is 27.3 J/cm$^3$. At 1 kHz, the energy storage density is 24.0 J/cm$^3$ and at 100 Hz, the energy storage density is 23.1 J/cm$^3$. The decrease in energy density of the bismuth zinc niobate capacitors at increased temperatures is due to a decrease in the breakdown strength of the material at elevated temperatures. As the temperature increases, the conductivity of the film will increase. At 200° C., the breakdown strength of the material at 100 Hz is 3.5 MV/cm, while the breakdown strength at both 1 kHz and 10 kHz is 3 MV/cm.

Power density is calculated using equation 3:

$$P = \frac{\pi f J}{\tan \delta} \quad (3)$$

in which P is the power density, f is the measurement frequency, tan δ is the high-field loss tangent of the film, and J is energy storage density. The calculated power densities for the films at measurement frequencies of 1 kHz and 10 kHz are listed in Table 1 as a function of temperature.

TABLE 1

| Temperature (° C.) | Power Storage Density at 10 kHz (MW/cm$^3$) | Power Storage Density at 1 kHz (MW/cm$^3$) |
|---|---|---|
| 25 | 700 | 20 |
| 50 | 650 | 20 |
| 100 | 630 | 8.0 |
| 150 | 98 | 34 |
| 200 | 66 | 0.90 |

Figure 13:
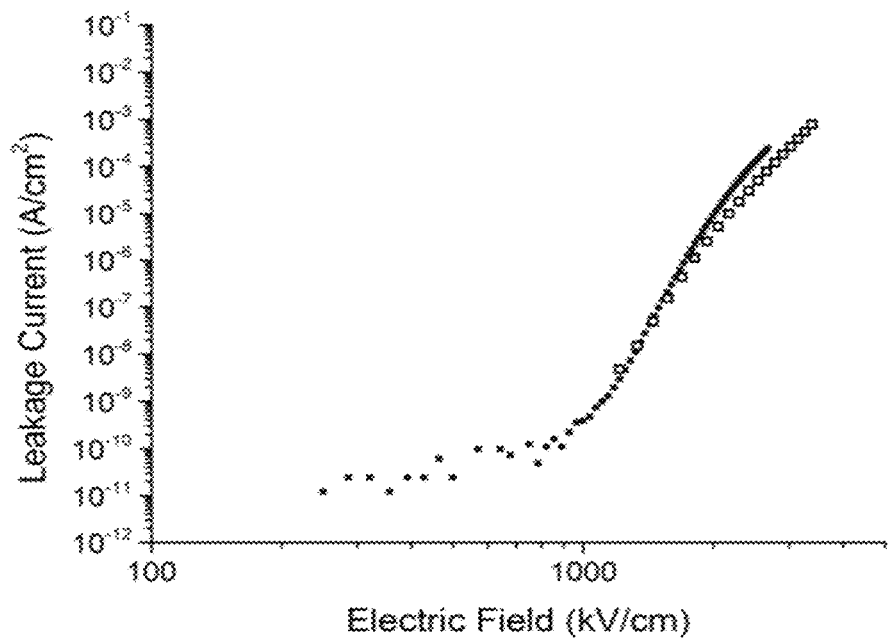
FIG. 13 is a graphical plot of leakage current density versus DC electric field for $Bi_{1.5}Zn_{0.9}Nb_{1.5}O_{6.9}$ thin films produced according to an embodiment of the present disclosure and illustrating a DC breakdown strength between 3 and 4 MV/cm. When the diameter of the electrodes were 200 μm (open squares), the films had a DC breakdown strength between 3 and 4 MV/cm; when the diameter of the top electrode was increased to 2 mm (closed squares), the DC breakdown strength was between 2 and 3 MV/cm.

FIG. 13 shows the leakage current density as a function of DC electric field for cubic pyrochlore bismuth zinc niobate thin films. The leakage current for this material is low, on the order of 10$^{-9}$ A/cm$^2$, and the DC breakdown strength of the material occurs between 3 and 4 MV/cm. The magnitude of the leakage current is consistent with other reports, although the DC breakdown strength of these films exceeds those reported in the literature.

The moderate relative permittivity of these films, as well as their low dielectric loss values and high breakdown strengths, resulted in a high energy storage density. The reproducible energy storage density of $Bi_{1.5}Zn_{0.9}Nb_{1.5}O_{6.9}$ exceeds that of other lead-free ceramic and polymer energy storage materials in the literature. In addition to its high values for energy storage density at room temperature, bismuth zinc niobate maintains a high energy storage density at temperatures up to 200° C. Further improvements in the energy storage density of cubic pyrochlore bismuth zinc niobate could be realized through the minimization of dielectric loss at large electric fields. Furthermore, the complete elimination of porosity between layers may improve the relative permittivity, and resulting energy storage density, of cubic pyrochlore bismuth zinc niobate thin films.

In summary, thin films of cubic pyrochlore bismuth zinc niobate, a slightly nonlinear dielectric, are provided. A novel Pechini method solution preparation was used for the deposition of the $Bi_{1.5}Zn_{0.9}Nb_{1.5}O_{6.9}$ thin films. The films are smooth and mostly dense, as confirmed by scanning electron microscopy. The films have a medium relative permittivity of 145. At frequencies of 1 kHz, the films exhibit a low loss tangent of 0.00065, and a maximum field of approximately 4.5 MV/cm. At 100 Hz and 10 kHz, the dielectric loss of the films increased to 0.0065, although the maximum field sustained by the films increased to 5 MV/cm. The films maintained a high energy storage density across a range of frequencies and temperatures. At a measurement frequency of 10 kHz, the maximum energy storage density reached is ~56.7 J/cm$^3$ while at a measurement frequency of 100 Hz, the maximum energy density is ~46.7 J/cm$^3$. As temperature is increased to 200° C., the maximum energy storage density remains high. At measurement frequencies of 10 kHz, the maximum energy density is ~27.3 J/cm$^3$, while at 100 Hz, the maximum energy storage density is ~23.1 J/cm$^3$. Cubic pyrochlore bismuth zinc niobate has a DC breakdown strength of between 3 and 4 MV/cm and a low leakage current of approximately 10$^{-9}$ A/cm$^2$.

Second Embodiment

Thin films of cubic pyrochlore bismuth zinc niobate tantalate (BZNT), a lead-free dielectric, were fabricated using a solution chemistry based upon the Pechini method. Scanning electron microscopy confirmed that the films are smooth and mostly dense.

The thin films had a chemical composition/formula of $Bi_{1.5}Zn_{0.9}Nb_{(1.5-x)}Ta_{(x)}O_{6.9}$ with 0<x≤1.5. One of the BZNT films had a relative permittivity of approximately 122 and a loss tangent of 0.0008 at a frequency of 10 kHz. In some instances, the thin film dielectric material has a maximum applied electric field of at least 5.0 MV/cm at 10 kHz, preferably at least 5.25 MV/cm, and even more preferably at least 5.5 MV/cm. At 100 Hz, the tantalum-modified dielectric material has a maximum applied electric field of at least 4.7 MV/cm, preferably 5.0 MV/cm, and more preferably 5.2 MV/cm. Finally, at 1 kHz the tantalum-modified dielectric material has a maximum applied electric field of at least 4.5 MV/cm, preferably 4.75 MV/cm, and more preferably 5.0 MV/cm.

Regarding maximum energy storage density, the dielectric material exhibits at least 60 J/cm$^3$, preferably at least 63 J/cm$^3$, and more preferably at least 66 J/cm$^3$ at 25° C. and 10 kHz. At 1 kHz, and 25° C., the single phase tantalum-modified dielectric material has a maximum energy storage density of at least 50 J/cm$^3$ and preferably at least 54 J/cm$^3$.

The dielectric material also exhibits excellent maximum energy storage density at elevated temperatures. For example, at 200° C. and 10 kHz, the dielectric material has a maximum energy storage density of at least 30 J/cm$^3$, preferably at least 34 J/cm$^3$ and more preferably at least 37 J/cm$^3$ at 10 kHz. For a frequency of 1 kHz, and at 200° C., the dielectric material has a maximum energy storage density of at least 25 J/cm$^3$, preferably at least 30 J/cm$^3$, and more preferably at least 33 J/cm$^3$.

A process for making the single phase lead-free dielectric material is also provided. The process includes preparing separate precursors of bismuth, zinc, niobium and tantalum without the use of 2-methoxyethanol and pyridine. Each of the precursors are chelated, e.g. using citric acid, and the chelated precursors are mixed together to form a bismuth-zinc-niobium-tantalum mixture. The mixture is dried and then pyrolyzed to form a single phase cubic pyrochlore bismuth zinc niobate having a chemical stoichiometry of $Bi_{1.5}Zn_{0.9}Nb_{(1.5-x)}Ta_{(x)}O_{6.9}$ with 0<x≤1.5

In some instances, the niobium precursor contains niobium ethoxide and anhydrous ethylene glycol, the zinc precursor contains zinc acetate dihydrate and ethylene glycol, the bismuth precursor contains bismuth nitrate pentahydrate and ethylene glycol and/or the tantalum precursor contains tantalum ethoxide and ethylene glycol. Also, the bismuth-zinc-niobium-tantalum mixture can be dried at a temperature greater than 200° C. and the dried mixture can be pyrolyzed at a temperature greater than 300° C. In addition, the dried mixture can be subjected to a pre-pyrolyzing step/treatment at a temperature greater than 250° C.

In a preferred embodiment, the films exhibit a dielectric constant of approximately 122±4.0, a low dielectric loss of 0.0008, and a room-temperature, 10 kHz maximum field of approximately 5.5 MV/cm. At frequencies of 1 kHz and 100 Hz, the maximum field sustained by the material is 5.0 MV/cm and 5.2 MV/cm, respectively. At a measurement frequency of 10 kHz, the maximum energy storage density is ~66.9±2.4 J/cm$^3$, and at a measurement frequency of 1 kHz, the maximum energy storage is ~54.1±1.9 J/cm$^3$. As temperature is increased to 200° C., the maximum energy storage density is ~37.9±0.9 J/cm$^3$ at 10 kHz and at 1 kHz, the maximum energy storage density is ~33.2±1.1 J/cm$^3$.

In order to better teach the disclosure, but not limit its scope in any way, one or more examples are provided and discussed below.

Cubic pyrochlore $Bi_{1.5}Zn_{0.9}Nb_{1.425}Ta_{0.075}O_{6.9}$ (BZNT-5), $Bi_{1.5}Zn_{0.9}Nb_{1.35}Ta_{0.15}O_{6.9}$ (BZNT-10), $Bi_{1.5}Zn_{0.9}Nb_{1.275}Ta_{0.225}O_{6.9}$ (BZNT-15), and $Bi_{1.5}Zn_{0.9}Ta_{1.5}O_{6.9}$ (BZT) thin films were deposited via spin-coating. It is appreciated that the number in the BZNT-5, BZNT-10 and BZNT-15 identification refers to the mole percentage (mole fraction×100) of tantalum in the material. Precursor solutions were synthesized using a modified Pechini method. The cation sources used were bismuth nitrate pentahydrate, zinc acetate dihydrate, niobium ethoxide, and tantalum ethoxide (Sigma-Aldrich). The mole percent of tantalum ethoxide was varied to determine the optimum concentration of tantalum in terms of energy storage density. The 0.10 M solution was spin coated at 6,000 rpm for 45 seconds on a platinum-coated silicon wafer. The substrate was dried on a hotplate at 250° C. for three minutes, pre-pyrolyzed on a second hotplate at 350° C. for ten minutes, then pyrolyzed in air for ten minutes at 400° C. to remove organic species and densify the film. The film was crystallized in a rapid thermal anneal system for two minutes at 600° C. This process was repeated several times to increase film thickness. After the deposition of four layers, the film thickness was typically 150 nm.

The phase content of the film was analyzed with an x-ray diffractometer configured in focusing geometry using Cu Kα radiation. Patterns were collected over a 2θ range from 20° to 73°. The instrument step size was 0.02°, and the scan rate was 2° 2θ per minute.

The band gaps of $Bi_{1.5}Zn_{0.9}Nb_{(1.5-x)}Ta_{(x)}O_{6.9}$ films on magnesium oxide substrates were analyzed using UV-Vis spectroscopy in transmission mode over a wavelength range from 220 to 800 nm. The step size was 1 nm, and the transmission measurements were referenced to a clean, blank magnesium oxide substrate.

To measure the dielectric properties of the films, circular electrodes with diameters ranging from 200 µm to 3 mm were patterned on the film using a double layer lithography process. After patterning, 500 Å of platinum were sputtered onto the film; lift-off processing revealed top electrodes. The bottom platinum electrode was exposed using a 30% aqueous HF solution to remove the film. The film was annealed a final time at 600° C. for two minutes in a rapid thermal annealing system to improve the film-top electrode interface. Film thickness was measured using a profilometer.

The relative permittivity and loss tangent of the films were measured with an LCR meter at an AC oscillation voltage of 0.03 V over a frequency range from 100 Hz to 10 kHz. Polarization-electric field behavior was measured using a multiferroic analyzer.

Figure 14:
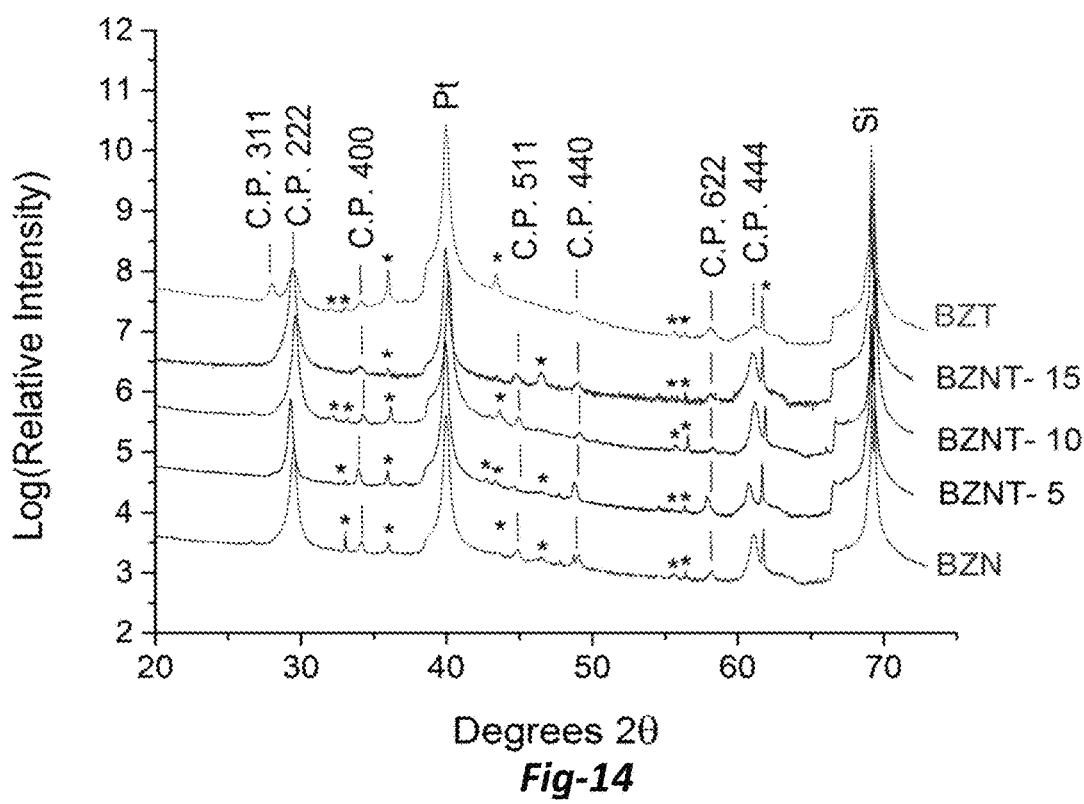
FIG. 14 is a plurality of x-ray diffraction (XRD) patterns for cubic pyrochlore $Bi_{1.5}Zn_{0.9}Nb_{1.5}O_{6.9}$ (BZN), $Bi_{1.5}Zn_{0.9}Nb_{1.45}Ta_{0.05}O_{6.9}$ (BZNT-5), $Bi_{1.5}Zn_{0.9}Nb_{1.40}Ta_{0.10}O_{6.9}$ (BZNT-10), $Bi_{1.5}Zn_{0.9}Nb_{1.35}Ta_{0.15}O_{6.9}$ (BZNT-15) and $Bi_{1.5}Zn_{0.9}Ta_{1.5}O_{6.9}$ (BZT) deposited on a platinized silicon substrate according to an embodiment of the present disclosure where the peaks marked with an asterisk (*) are due to the substrate or are diffraction from X-ray wavelengths other than Cu-Kα.

The films were analyzed using XRD to verify the phase content of the films with an XRD pattern obtained for the $Bi_{1.5}Zn_{0.9}Nb_{(1.5-x)}Ta_{(x)}O_{6.9}$ films with x=0.075, 0.15, 0.225 and 1.5, and a comparison with BZN, is shown in FIG. 14. The diffraction peaks are consistent with the cubic pyrochlore structure of bismuth zinc niobate (PDF #04-009-5437, 2002). There are no peaks that correspond to the formation of a secondary phase. Tantalum modification of bismuth zinc niobate on the niobium site should produce a homogeneous substitutional solid solution, in accordance with Hume-Rothery rules. Tantalum and niobium both have an ionic radius of 64 pm, an electronegativity of 1.5 and 1.6, respectively, and an oxidation state of +5. Additionally, bismuth zinc niobate and bismuth zinc tantalate both have a cubic pyrochlore crystal structure.

Figure 15:
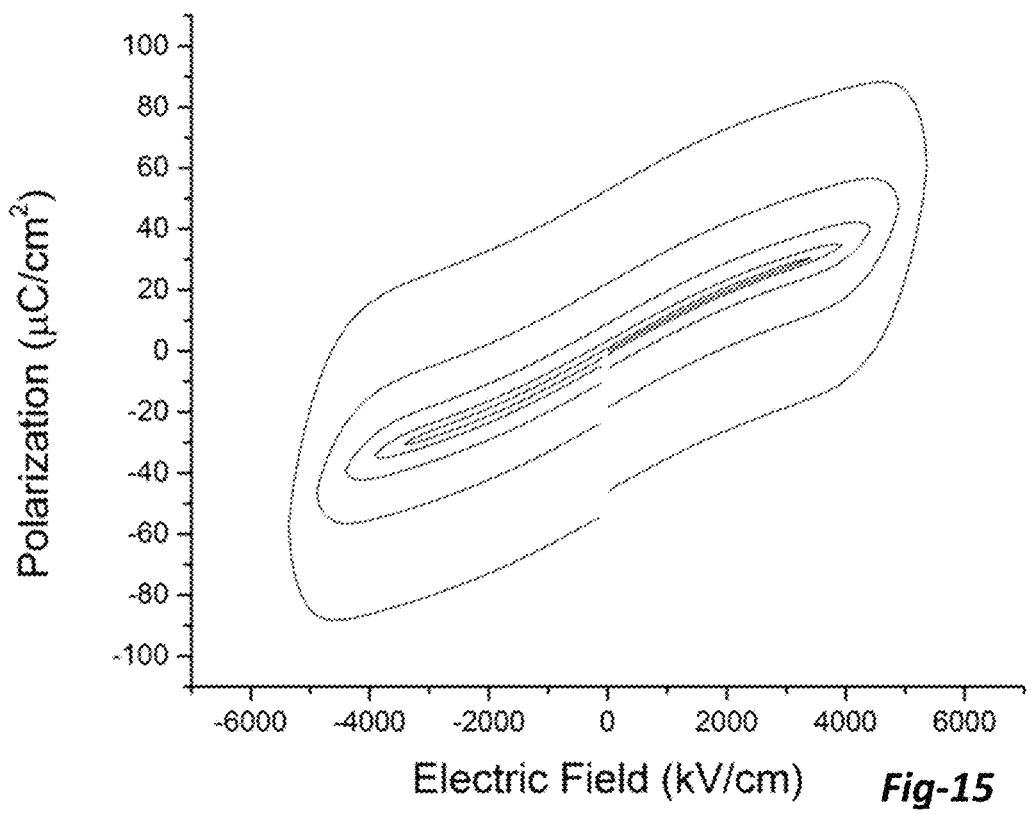
FIG. 15 is a graphical plot of polarization versus electric field illustrating the polarization-electric field behavior of cubic pyrochlore $Bi_{1.5}Zn_{0.9}Nb_{1.35}Ta_{0.15}O_{6.9}$ produced according to an embodiment of the present disclosure and illustrating that the cubic pyrochlore bismuth zinc niobate is a slightly nonlinear and low loss dielectric.

FIG. 15 shows the high-field polarization versus electric field behavior for bismuth zinc niobate modified with 10% tantalum (BZNT-10) at a measurement frequency of 10 kHz. The relative permittivity of the films is 122 and the loss tangent is 0.0008. The permittivity of the tantalum-modified film is lower than that of bismuth zinc niobate films prepared in the same manner (~145), while the loss tangents are of the same order of magnitude. At a measurement frequency of 10 kHz, the material sustained an electric field of 5.5 MV/cm. At lower measurement frequencies of 100 Hz and 1 kHz, the films sustain fields of 5.2 MV/cm and 5.0 MV/cm, respectively. The films reached catastrophic electrical breakdown at applied fields of 5.5 MV/cm at 10 Hz. This breakdown strength exceeds those reported in the literature for $Bi_{1.5}Zn_{0.9}Nb_{1.5}O_{6.9}$ by approximately 0.3 MV/cm.

Figure 16:
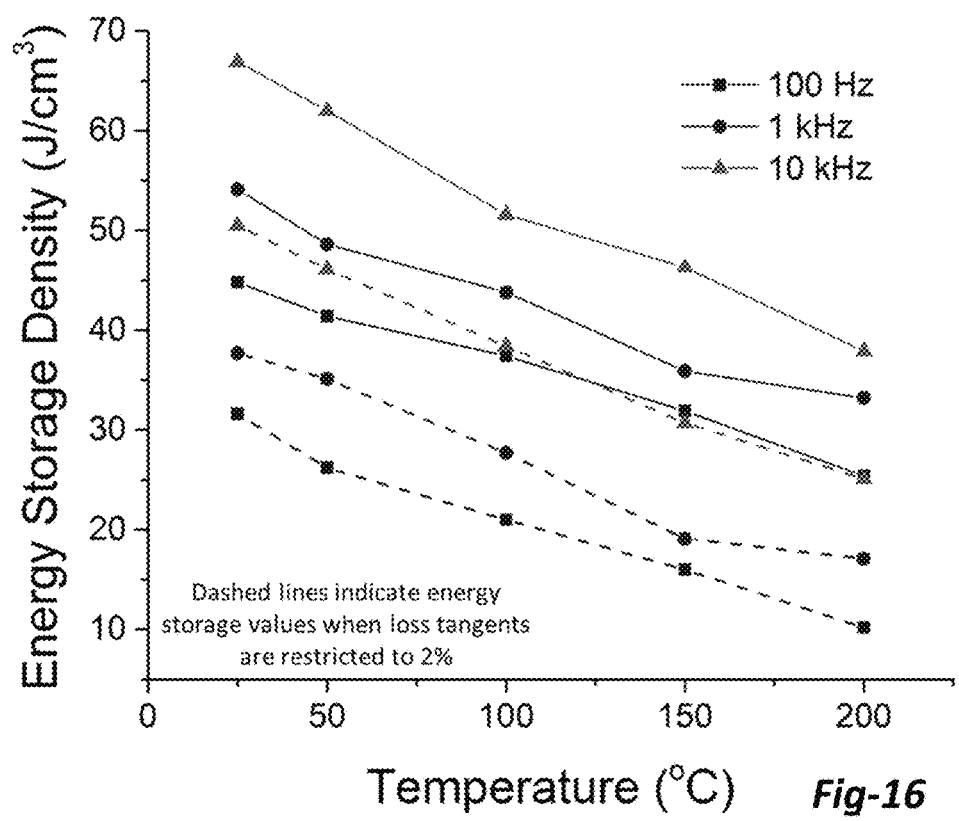
FIG. 16 is a graphical plot of energy storage density versus temperature for $Bi_{1.5}Zn_{0.9}Nb_{1.35}Ta_{0.15}O_{6.9}$ thin films produced according to an embodiment of the present disclosure and subjected to frequencies of 100 Hz, 1 kHz, and 10 kHz.

The high breakdown strength of tantalum-modified BZN contributes to a high energy storage density. FIG. 16 shows the maximum storage density achieved for the BZNT-10 films as a function of temperature and measurement frequency; these data points are connected by a solid line. These are the highest energy storage densities reported for lead-free materials, indicating that BZNT films may be suitable for energy storage purposes, including pulsed power applications. The maximum energy storage density is ~66.9±2.4 J/cm³ for measurement frequencies of 10 kHz, while for a measurement frequency of 1 kHz, the maximum recoverable energy density is ~54.1±1.9 J/cm³. The dashed lines in FIG. 16 show the energy storage density of the BZNT films recalculated with the maximum fields reduced to keep the high field loss tangent below 0.02. Although the energy storage densities under these loss conditions are reduced, the energy storage values are still high for all measurement frequencies.

As the temperature is increased, the energy storage density of the films remains high, and exceeds 20 J/cm³ at 200° C. This is slightly higher than the maximum energy storage density reported for any material at 200° C. The reduction in the energy density of BZNT-10 at elevated temperatures is due to a slight decrease in the breakdown strength, as well as an increase in the loss tangent, of the material at higher temperatures. As an example, at 200° C. and a measurement frequency of 10 kHz, the breakdown field of the material is reduced to 4.0 MV/cm.

The energy storage density as a function of tantalum concentration is summarized in Table 2 below. As the concentration of tantalum increased, the permittivity of the films decreased, as expected. Further, as the concentration of tantalum increased, the maximum field sustained by the films increased. A concentration of 10% tantalum (BZNT-10) was determined to be optimal, as the energy storage density was maximized at this tantalum concentration.

TABLE 2

|  | BZN | BZN with 5% Ta | BZN with 10% Ta | BZN with 15% Ta |
|---|---|---|---|---|
| 100 Hz Energy Storage (J/cm³) | 46.7 ± 1.7 | 38.5 ± 1.4 | 44.8 ± 1.6 | 40.9 ± 1.5 |
| 1 kHz Energy Storage (J/cm³) | 47.1 ± 1.7 | 46.7 ± 1.6 | 54.1 ± 1.9 | 49.6 ± 1.8 |
| 10 kHz Energy Storage (J/cm³) | 60.8 ± 2.0 | 61.7 ± 2.2 | 66.9 ± 2.4 | 65.0 ± 2.3 |

The maximum delivered power density for a linear dielectric is related to the energy storage density using equation 4:

$$P = \frac{\pi f J}{\tan \delta} \quad (4)$$

in which P is the maximum power density, f is the measurement frequency, and tan δ is the loss tangent for the electric field at which J, the energy storage density, is calculated. The power storage densities for the optimized bismuth zinc niobate tantalate composition are listed in Table 3.

TABLE 3

| Temperature (° C.) | Power Storage Density at 10 kHz (MW/cm$^3$) | Power Storage Density at 1 kHz (MW/cm$^3$) |
|---|---|---|
| 25 | 850 | 45 |
| 50 | 720 | 40 |
| 100 | 710 | 25 |
| 150 | 700 | 8 |
| 200 | 530 | 3 |

Despite the decrease in the relative permittivity of bismuth zinc niobate upon modification with tantalum, the energy storage density of the material is improved due to the increase in the breakdown strength achieved by compositionally tuning the band gap. The energy storage density of $Bi_{1.5}Zn_{0.9}Nb_{1.35}Ta_{0.15}O_{6.9}$ exceeds that of other lead-free materials in the literature. Also, the large energy storage density values are maintained at elevated temperatures up to 200° C. Through the minimization of high-field dielectric loss due to increased conductivity through the films near breakdown, further improvements in the energy storage density of $Bi_{1.5}Zn_{0.9}Nb_{1.35}Ta_{0.15}O_{6.9}$ can be achieved.

Figure 17:
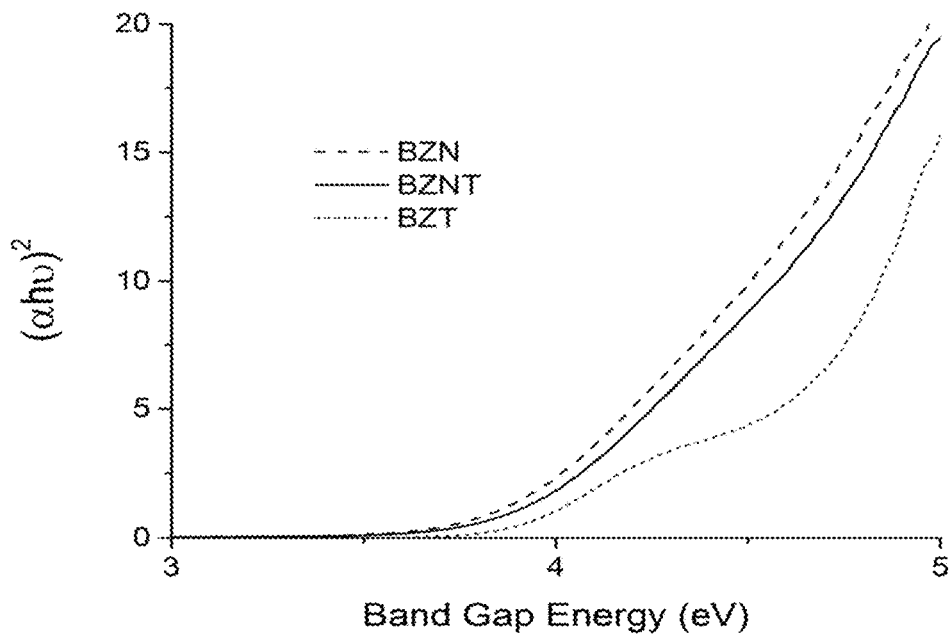
FIG. 17 is three normalized Tauc plots for $Bi_{1.5}Zn_{0.9}Nb_{1.5}O_{6.9}$ (dashed line), $Bi_{1.5}Zn_{0.9}Ta_{1.5}O_{6.9}$ (dotted line), and $Bi_{1.5}Zn_{0.9}Nb_{1.35}Ta_{0.15}O_{6.9}$ (solid line) on a magnesium oxide substrate with the shift in the onset of absorbance indicating that modification with tantalum increased the band gap of the material.

FIG. 17 shows the Tauc plot used for the band gap analysis of $Bi_{1.5}Zn_{0.9}Nb_{1.5}O_{6.9}$ (dashed line), $Bi_{1.5}Zn_{0.9}Nb_{1.35}Ta_{0.15}O_{6.9}$ (solid line), and the bismuth zinc tantalate end member composition—$Bi_{1.5}Zn_{0.9}Ta_{1.5}O_{6.9}$ (dotted line). To ensure that small errors (in the background subtraction or absorbance) due to small differences in film thickness, did not perturb the analysis, the maximum absorbance numbers were normalized to the same value. Therefore, the observed shift in absorbance onset is due to a change in band gap. As seen in FIG. 17, the band gap of bismuth zinc niobate was 3.72±0.06 eV, while that of bismuth zinc tantalate was 3.88±0.04 eV. The band gap for the $Bi_{1.5}Zn_{0.9}Nb_{1.35}Ta_{0.15}O_{6.9}$ solid solution sample shown fell between the magnitudes of the band gaps of the end members. The observed change in band gap was reproducible across the surface of the film, and across multiple films of these compositions.

To determine whether the increase in band gap correlated with an increase in breakdown strength of the material, a film of bismuth zinc tantalate was electrically characterized. This film exhibited a room-temperature relative permittivity of 55±2 and a loss tangent of 0.0004±0.0001. The measured permittivity value was lower than previously reported values for bulk ceramics, and the loss tangent is approximately an order of magnitude lower than previous reports in the literature. The tunability of bismuth zinc tantalate was approximately an order of magnitude lower than that of bismuth zinc niobate. At DC fields of 1.5 MV/cm and an AC oscillation voltage of 0.03 V, bismuth zinc tantalate exhibited a tunability of 4.5%; under identical field and measurement conditions, bismuth zinc niobate exhibited a tunability of 24%.

The breakdown strength of the tantalate films was higher than that of the bismuth zinc niobate films, and the high field loss tangent remained low. Weibull plots were used to determine the breakdown strength of these films. The values of the Weibull parameters are given in Table 4 below. The Weibull parameter for each condition was calculated using a total of ten electrodes. The large Weibull parameter values indicate that the breakdown strengths exhibited little variation from electrode to electrode. As shown in Table 4, the 10 kHz breakdown strength of the $Bi_{1.5}Zn_{0.9}Ta_{1.5}O_{6.9}$ film was 6.1 MV/cm. At 1 kHz, the breakdown strength was 5.5 MV/cm. The combination of an improved breakdown strength and lower high field loss correlates well with an increase in the band gap of the material.

TABLE 4

|  | 1 kHz | 10 kHz |
|---|---|---|
| Breakdown Strength (MV/cm) | 5.5 ± 0.1 | 6.1 ± 0.1 |
| Weibull Parameter | 34.0 ± 2.4 | 95.1 ± 6.0 |

Figure 18:
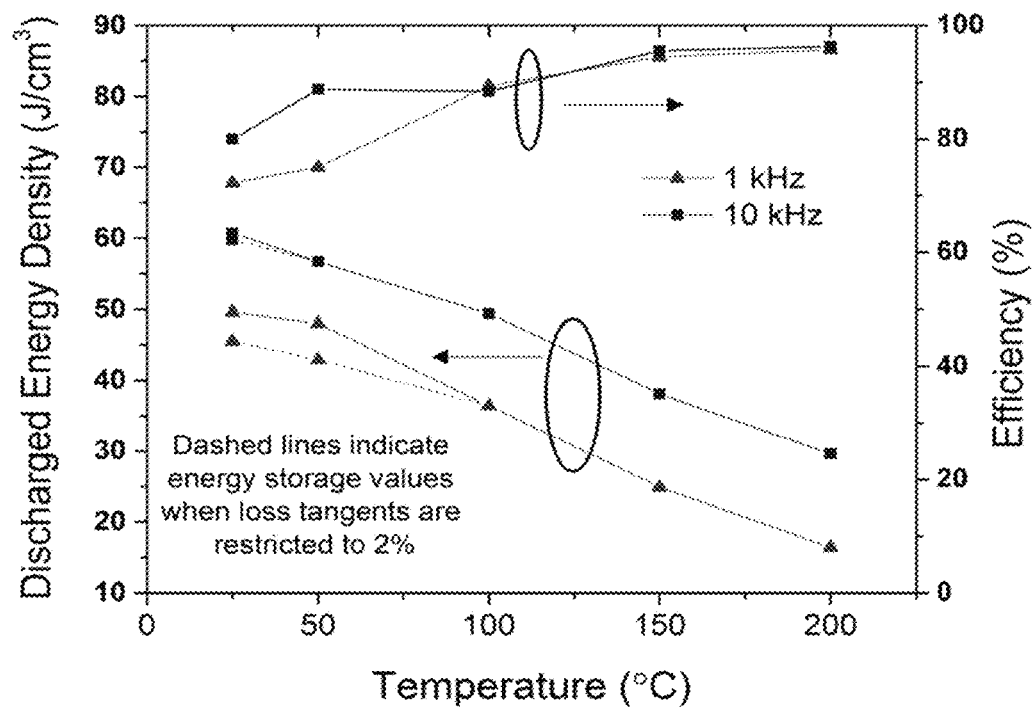
FIG. 18 is a graphical plot of maximum energy storage density and discharge efficiency as a function of temperature for the BZT thin film.

The maximum discharged energy storage density for the bismuth zinc tantalate films was 60.7±2.0 J/cm$^3$ at 10 kHz, which is comparable with the maximum discharged energy storage density of bismuth zinc niobate films. This is the discharged energy storage density (i.e. losses were excluded). For this case, any improvement in the energy storage density of the tantalate composition due to the enhancement in breakdown strength, reduced tunability, and lower high field loss is offset by the reduction in relative permittivity of the bismuth zinc tantalate. However, some applications require that the loss of the material remain below 2%; in many materials targeting these applications, the maximum energy storage density is limited by the loss of the film, rather than the breakdown strength. Given this constraint, bismuth zinc tantalate exhibited extremely low high field losses across a range of temperatures and frequencies. As seen in FIG. 18, for most temperatures and frequencies, the films can be subjected to their maximum field prior to breakdown without the loss tangent exceeding 2%, resulting in extremely high efficiencies for the material.

Third Embodiment

Thin films of a nanocomposite having an average composition of $Bi_{1.5}Zn_{0.9}Nb_{1.35}Ta_{0.15}O_{6.9}$ (BZNT) with an amorphous matrix and nanoparticles of $Bi_2O_3$ (BO) were prepared on platinized polyimide-coated silicon wafers via a Pechini-based chemical solution deposition method. Precursors of bismuth, zinc, niobium, and tantalum were mixed with a solvent and then chelated using a chelating agent. For example, precursors of bismuth nitrate pentahydrate, zinc acetate dihydrate, niobium ethoxide, and tantalum ethoxide were separately mixed with ethylene glycol for 30 minutes at 80° C. to create homogeneous alcoholic solutions. Citric acid was added to each cationic solution using a 1:1 ratio of citric acid to organometallic precursor and then stirred on a hotplate at 80° C. for 2 hours to allow for chelation of the metal atoms. Following chelation, the zinc, tantalum, and niobium solutions were combined and stirred for 2 hours at 80° C. in order to promote intimate mixing. Finally, the bismuth precursor was added to the solution which was then stirred at 80° C. for 1 hour. The final molarity of the solution was 0.10 M.

Platinized polyimide-coated silicon wafers were preconditioned on a hotplate. In particular, a wafer was placed on a room-temperature hotplate that was slowly heated to 120° C. The wafer was allowed to remain on the hotplate for 30 minutes and then transferred to a hotplate at 250° C. for 5 minutes. Thereafter, the wafer was placed on a hotplate at 350° C. for 10 minutes. It is appreciated that such a process imitates the thermal cycle used during dielectric film processing.

Following preconditioning of the silicon wafers, the precursor solution was spin coated at 4000 rpm for 40 seconds on the wafer. The substrate was dried on a hotplate at 250° C. for 3 minutes and then pyrolyzed on a second hotplate at 350° C. for 10 minutes. It is appreciated that the pyrolysis removed organic species and densified the film recently applied. The process of spin casting with drying and pyrolysis treatments was repeated several times in order to increase the film thickness deposited on the wafer. For example, after deposition of four layers, i.e. four coating treatments, the film thickness was approximately 150 nm.

Figure 19:
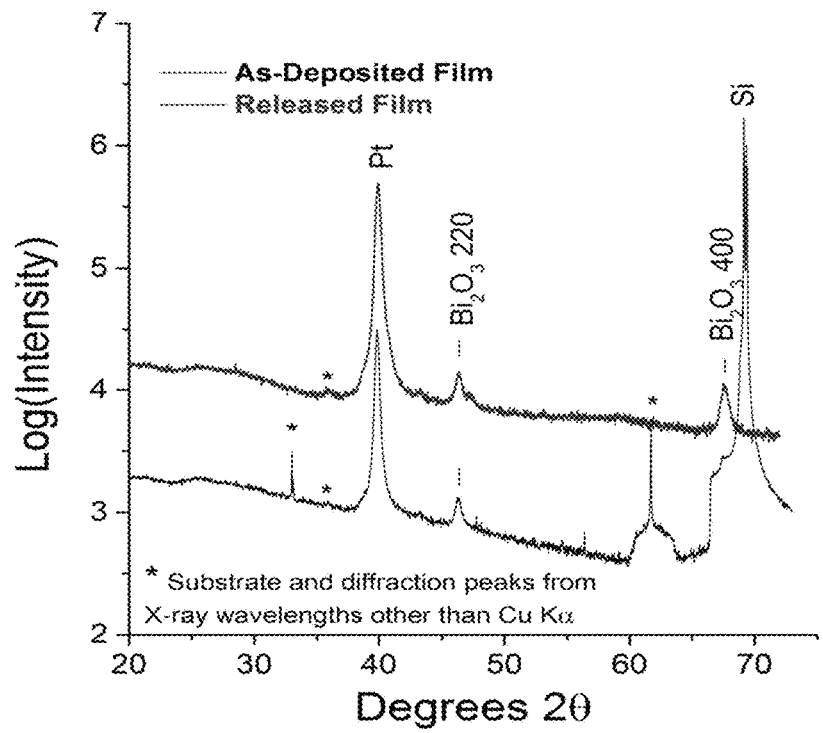
FIG. 19 is an XRD pattern of a nanocomposite film with an average composition of $Bi_{1.5}Zn_{0.9}Nb_{1.35}Ta_{0.15}O_{6.9}$ with crystallites of $Bi_2O_3$ in an amorphous matrix (herein referred to as BZNT-BO) deposited on a platinized silicon substrate according to an embodiment disclosed herein.

The films were analyzed using x-ray diffraction in order to determine if there was any evidence of crystallinity in the films. As shown in FIG. 19, two peaks were identified which were consistent with diffraction peaks of $Bi_2O_3$. As such, the matrix of the BZNT-BO thin films was amorphous.

Figure 20:
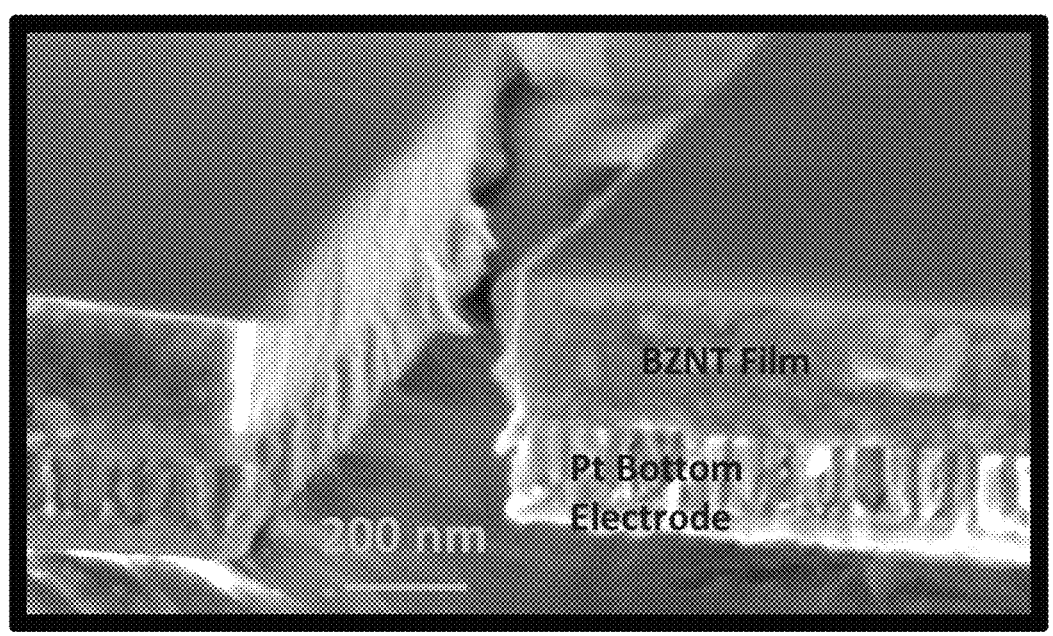
FIG. 20 is a cross-sectional SEM image of the nanocomposite BZNT-BO thin film.

Looking now at FIG. 20, an SEM image of the nanocomposite BZNT-BO thin film is shown. In addition, the films were wrinkle free and dense and the interface between the film and the columnar platinum bottom electrode was smooth. It is appreciated that such a smooth interface minimizes electric field concentrations that are typical of rough interfaces.

Figure 21:
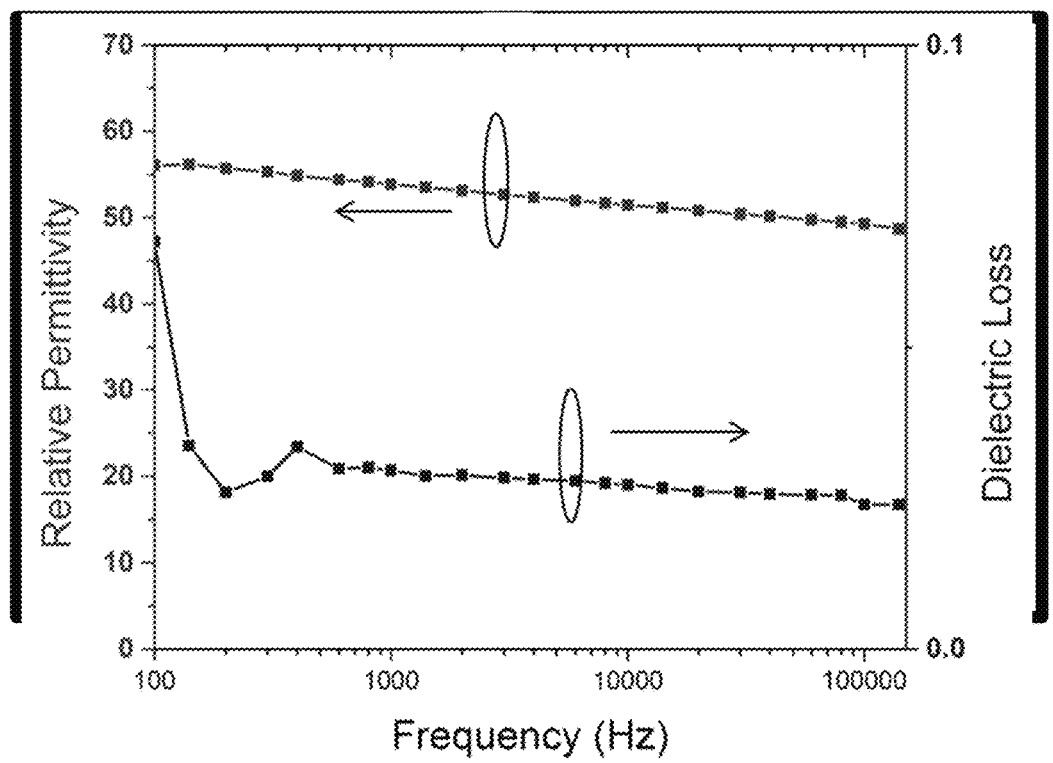
FIG. 21 is a graphical plot of relative permittivity and loss tangent as a function of measurement frequency for the nanocomposite BZNT-BO thin film.

Relative permittivity and dielectric loss were measured for the films and a graph of such is shown in FIG. 21. As shown in the figure, the films had a relative permittivity of approximately 55 and a low dielectric loss on the order of 0.03.

Figure 22A:
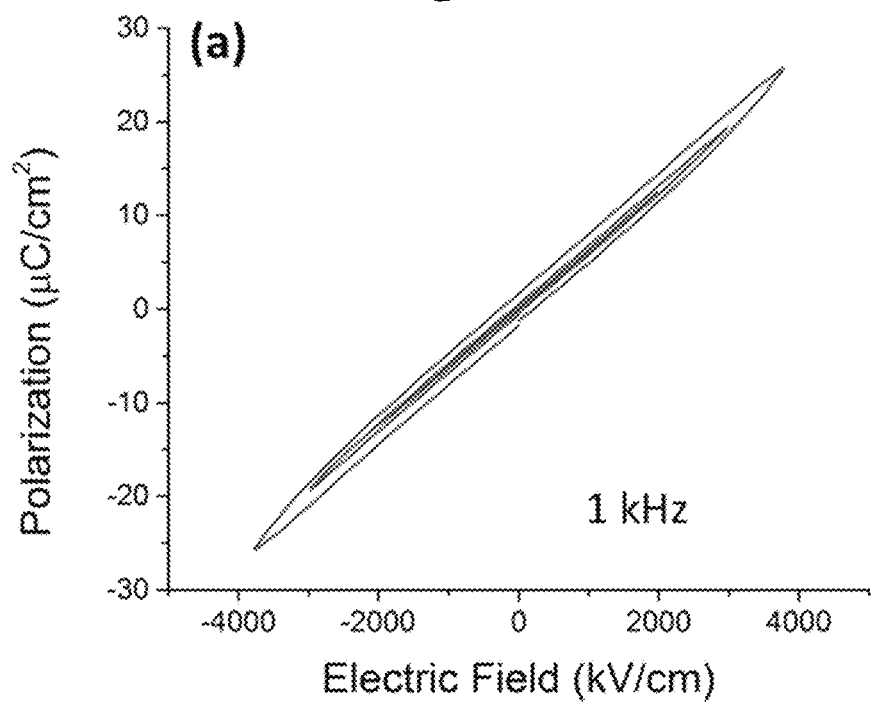
FIG. 22(a) is a graphical plot of polarization-electric field behavior at 1 kHz for the nanocomposite BZNT-BO thin film.
Figure 22B:
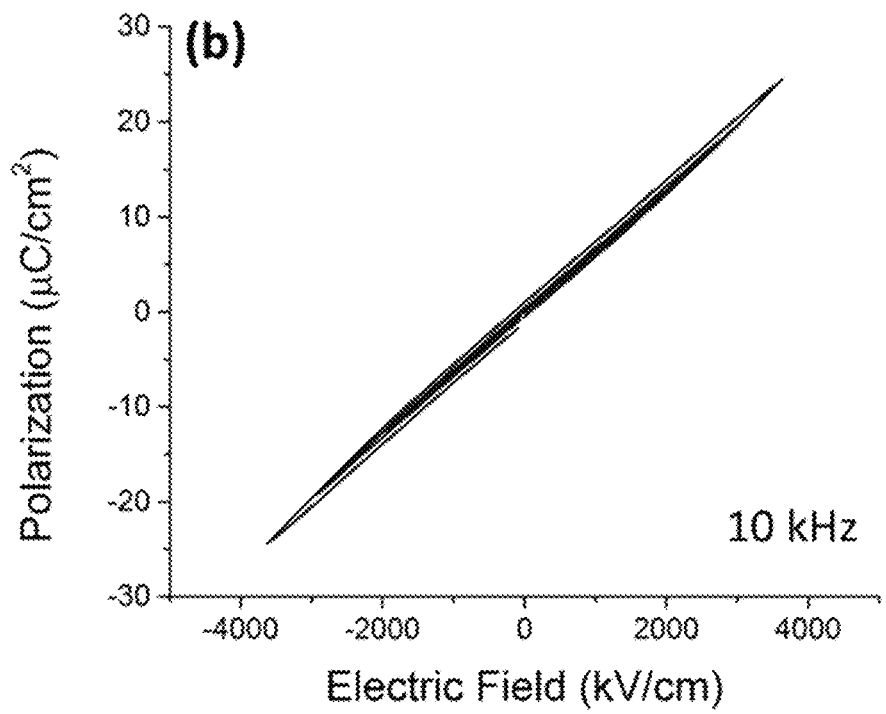
FIG. 22(b) is a graphical plot of polarization-electric field behavior at 10 kHz for the nanocomposite BZNT-BO thin film.

Polarization versus electric field behavior was also measured for the films and FIG. 22 provides a graphical plot for polarization with the nanocomposite films under an AC electric field of 3.8 MV/cm with a measurement frequencies of 1 kHz (FIG. 22(a)) and 10 kHz (FIG. 22(b)). As noted by the hysteresis loop in the figure, the nanocomposite film is slightly nonlinear and has low dielectric loss. Furthermore, the breakdown strength of these films was approximately 3.8 MV/cm for measurement frequencies of 1 kHz and 10 kHz.

Figure 23:
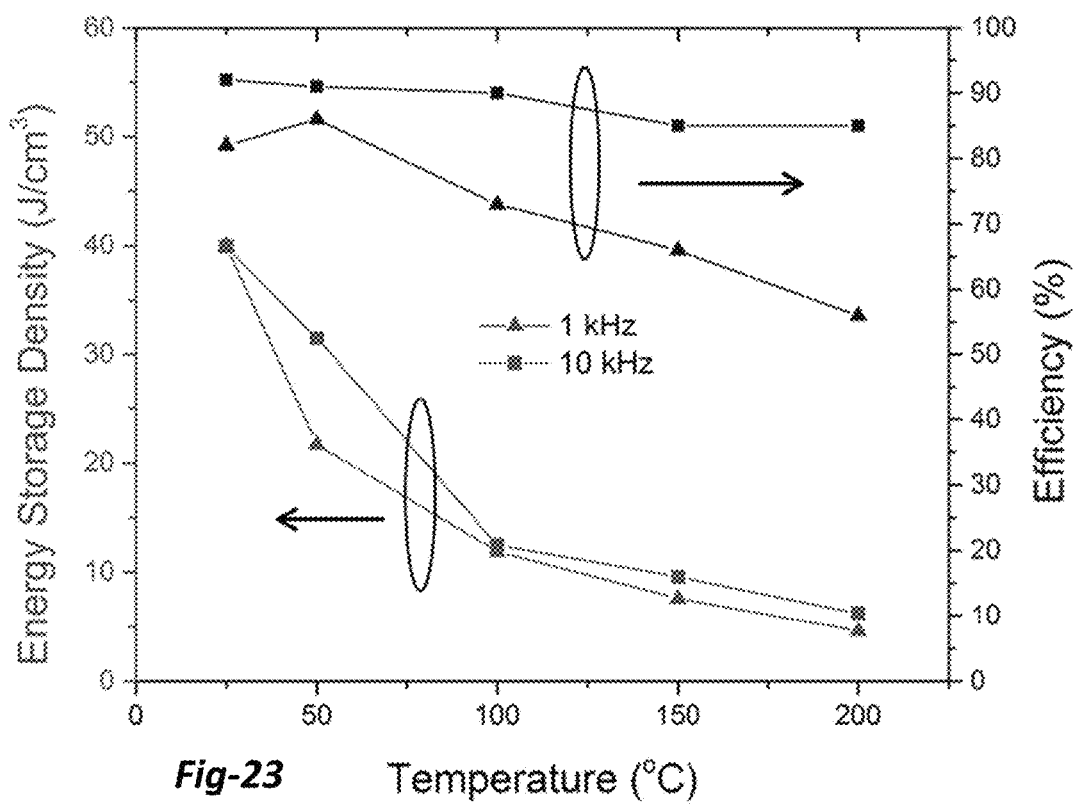
FIG. 23 is a graphical plot of maximum energy storage density and discharge efficiency as a function of temperature for the nanocomposite BZNT-BO thin film.

The energy storage density and discharge efficiency of the nanocomposite BZNT thin films were calculated and are shown in FIG. 23. The calculations reflect discharge energy densities in which the losses of the material, i.e. the area enclosed within the hysteresis loop of FIG. 22, is not included in the shown energy density. The films have a high room-temperature energy storage density of approximately 40 J/cm³. It is appreciated that such a room-temperature energy storage density is the highest energy storage density known for a material processed at a maximum temperature of 350° C. After establishing a baseline of dielectric properties, crack-free released films underwent compressive and tensile flexible testing. After bending the films around a minimum bend diameter of 7 mm (which corresponds to a maximum strain level of 0.10%) for 30,000 mechanical bending cycles, the dielectric properties and energy storage density of the films was unchanged, indicating that nanocomposite bismuth zinc niobate tantalite films may be suitable for flexible energy storage applications.

It should be appreciated that the embodiments, examples, etc. discussed above are for illustrative purposes only. Modifications, changes, etc., to the thin films of cubic pyrochlore bismuth zinc niobate-based material and the process of making such films can be made by those skilled in the art and still fall within the scope of the disclosure. As such, it is the claims, and all equivalents thereof, which define the scope of the disclosure.

We claim:

1. A process for making a single phase lead-free cubic pyrochlore bismuth zinc niobate (BZN)-based dielectric material, the process comprising:
    preparing separate precursors of bismuth, zinc and niobium without the use of 2-methoxyethanol and pyridine;
    chelating each of the precursors of bismuth, zinc and niobium;
    mixing the chelated precursors of bismuth, zinc and niobium and forming a bismuth-zinc-niobium mixture;
    drying the mixture; and
    pyrolyzing the dried mixture and forming a single phase dielectric material with a chemical composition of $Bi_{1.5}Zn_{(0.5+y)}Nb_{(1.5-x)}Ta_{(x)}O_{(6.5+y)}$, with $0 \leq x < 0.23$ and $0 \leq y < 0.9$.

2. The process of claim 1, wherein the niobium precursor contains niobium ethoxide and anhydrous ethylene glycol.

3. The process of claim 2, wherein the zinc precursor contains zinc acetate dihydrate and ethylene glycol.

4. The process of claim 3, wherein the bismuth precursor contains bismuth nitrate pentahydrate and ethylene glycol.

5. The process of claim 4, wherein the precursors of bismuth, zinc and niobium are chelated with citric acid.

6. The process of claim 1, wherein the mixture is dried at a temperature greater than 200° C.

7. The process of claim 1, wherein the dried mixture is pyrolyzed at a temperature greater than 250° C.

8. The process of claim 1, further including pre-pyrolyzing the dried mixture at a temperature greater than 300° C.

9. The process of claim 1, wherein the single phase dielectric material has at least one of a maximum applied electric field of at least 4.0 MV/cm at 10 kHz, a maximum energy storage at 25° C. and 10 kHz of at least 50 J/cm³, and a maximum energy storage at 200° C. and 10 kHz of at least 22 J/cm³.

10. The process of claim 1, further comprising preparing a separate precursor of tantalum without the use of 2-methoxyethanol and pyridine, the precursor of tantalum containing tantalum ethoxide and ethylene glycol.

11. The process of claim 10, further comprising chelating the precursor of tantalum, mixing the chelated precursors of bismuth, zinc, niobium and tantalum to form a bismuth-zinc-niobium-tantalum mixture;
    drying the mixture; and
    pyrolyzing the dried mixture and forming a single phase dielectric material with a chemical composition of $Bi_{1.5}Zn_{(0.5+y)}Nb_{(1.5-x)}Ta_{(x)}O_{(6.5+y)}$, with $0.1 \leq x < 0.2$ and $0.2 \leq y < 0.7$.

12. The process of claim 11, wherein the single phase dielectric material has at least one of a maximum applied electric field of at least 5.0 MV/cm at 10 kHz, a maximum energy storage at 25° C. and 10 kHz of at least 60 J/cm³ and a maximum energy storage at 200° C. and 10 kHz of at least 30 J/cm³.

13. The process of claim 12, wherein the single phase dielectric material has at least one of a maximum applied electric field of at least 4.5 MV/cm at 1 kHz, a maximum applied electric field of at least 4.7 MV/cm at 100 Hz, and a maximum applied electric field of at least 5.25 MV/cm at 10 kHz.

14. The process of claim 13, wherein the single phase dielectric material has at least one of a maximum applied electric field of at least 5.0 MV/cm at 1 kHz, a maximum applied electric field of at least 5.2 MV/cm at 100 Hz, and a maximum applied electric field of at least 5.5 MV/cm at 10 kHz.

15. The process of claim 11, wherein the single phase dielectric material has at least one of a maximum energy storage of at least 50 J/cm$^3$ at 1 kHz and 25° C., a maximum energy storage electric storage of at least 63 J/cm$^3$ at 10 kHz and 25° C., a maximum energy storage of at least 25 J/cm$^3$ at 1 kHz and 200° C., and a maximum energy storage of at least 30 J/cm$^3$ at 10 kHz and 200° C.

16. The process of claim 15, wherein the single phase dielectric material has at least one of a maximum energy storage of at least 54 J/cm$^3$ at 1 kHz and 25° C., a maximum energy storage electric storage of at least 66 J/cm$^3$ at 10 kHz and 25° C., a maximum energy storage of at least 33 J/cm$^3$ at 1 kHz and 200° C., and a maximum energy storage of at least 37 J/cm$^3$ at 10 kHz and 200° C.

17. The process of claim 11, further comprising forming nanoparticles of $Bi_2O_3$ within an amorphous matrix of the single phase dielectric material.

18. The process of claim 17, wherein the amorphous matrix of the single phase dielectric material with nanoparticles of $Bi_2O_3$ is a thin film.

* * * * *